United States Patent
Yi et al.

(10) Patent No.: US 11,030,094 B2
(45) Date of Patent: Jun. 8, 2021

(54) APPARATUS AND METHOD FOR PERFORMING GARBAGE COLLECTION BY PREDICTING REQUIRED TIME

(71) Applicant: SK hynix Inc., Gyeonggi-do (KR)

(72) Inventors: Yeong-Sik Yi, Gyeonggi-do (KR); Jin-Woong Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/502,964

(22) Filed: Jul. 3, 2019

(65) Prior Publication Data
US 2020/0042438 A1    Feb. 6, 2020

(30) Foreign Application Priority Data

Jul. 31, 2018  (KR) .................. 10-2018-0089400
Dec. 21, 2018  (KR) .................. 10-2018-0167583

(51) Int. Cl.
*G06F 12/02*     (2006.01)
*G06F 12/0891*   (2016.01)

(52) U.S. Cl.
CPC ...... *G06F 12/0253* (2013.01); *G06F 12/0891* (2013.01); *G06F 2212/1044* (2013.01); *G06F 2212/7205* (2013.01)

(58) Field of Classification Search
CPC ............. G06F 12/0253; G06F 12/0891; G06F 2212/1044; G06F 2212/7205
See application file for complete search history.

(56) References Cited

U.S. PATENT DOCUMENTS

| | | | | |
|---|---|---|---|---|
| 2008/0034174 A1* | 2/2008 | Traister | ............... | G06F 12/0246 711/159 |
| 2014/0059301 A1* | 2/2014 | Rao | ............... | G06F 11/1012 711/150 |
| 2017/0132074 A1* | 5/2017 | Zhang | ............... | G11C 29/52 |
| 2017/0351459 A1* | 12/2017 | Moon | ............... | G06F 3/0652 |
| 2018/0004653 A1* | 1/2018 | Moon | ............... | G06F 12/0246 |
| 2018/0285256 A1* | 10/2018 | Oh | ............... | G06F 3/0613 |
| 2019/0121725 A1* | 4/2019 | Sehgal | ............... | G06F 12/0246 |

FOREIGN PATENT DOCUMENTS

| | | |
|---|---|---|
| KR | 10-2013-0142103 | 12/2013 |
| KR | 10-2016-0044989 | 6/2016 |
| KR | 10-2016-0075229 | 6/2016 |
| KR | 10-2016-0110596 | 9/2016 |

* cited by examiner

*Primary Examiner* — Eric T Oberly
(74) *Attorney, Agent, or Firm* — IP & T Group LLP

(57) ABSTRACT

A memory system includes a nonvolatile memory device including a plurality of dies, each die including a plurality of planes, each plane including a plurality of blocks, each block including a plurality of pages, and further includes a plurality of page buffers, each page buffer for caching data in a unit of a page to be inputted to, and outputted from, each of the blocks; and a controller suitable for managing a plurality of super blocks according to a condition, each super block including N blocks capable of being read in parallel among the blocks, generating predicted required times for the super blocks, respectively, each of the predicted required times representing a time needed to extract valid data from the corresponding super block, and selecting a victim block for garbage collection from among the blocks based on the predicted required times.

18 Claims, 10 Drawing Sheets

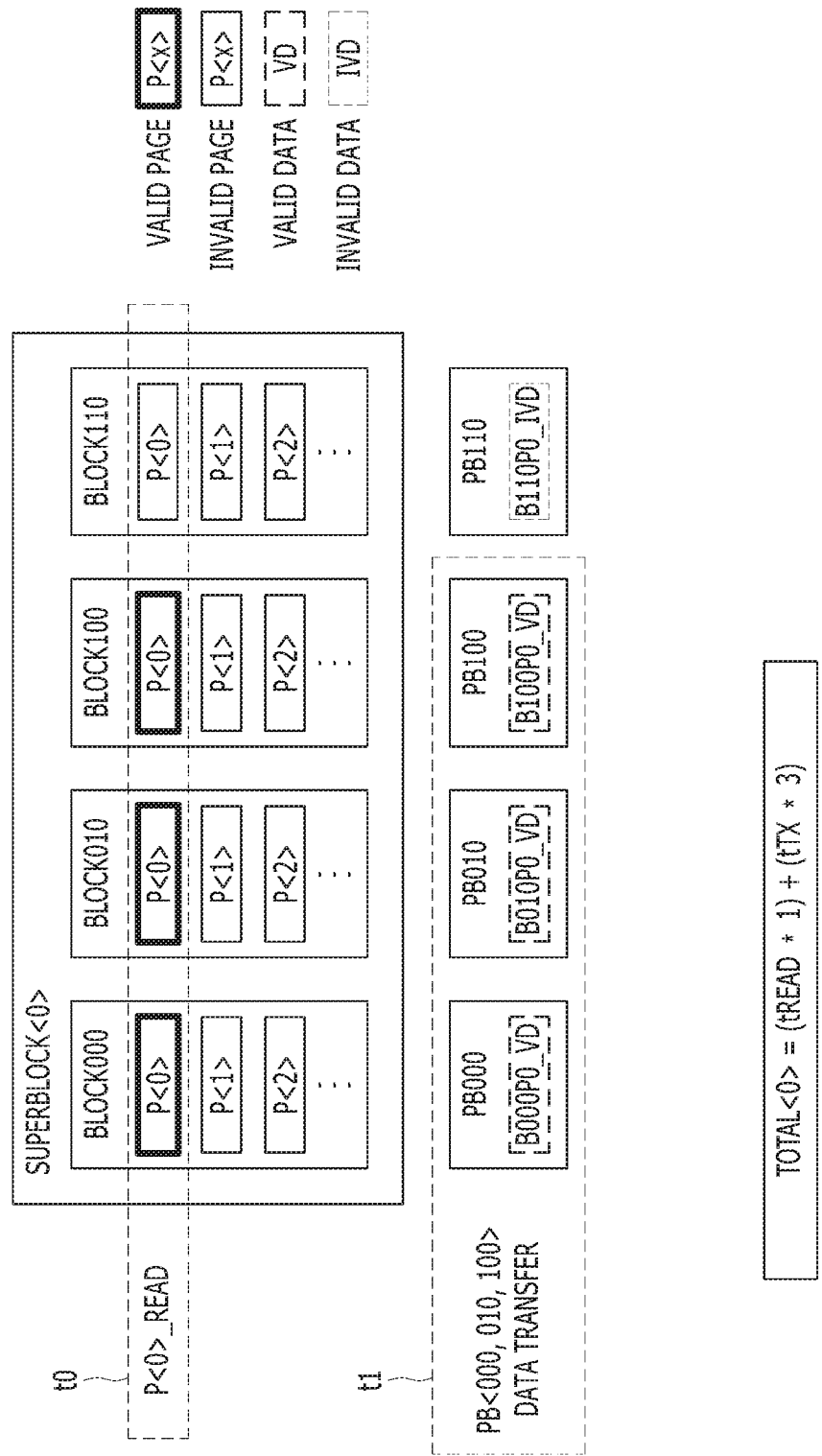

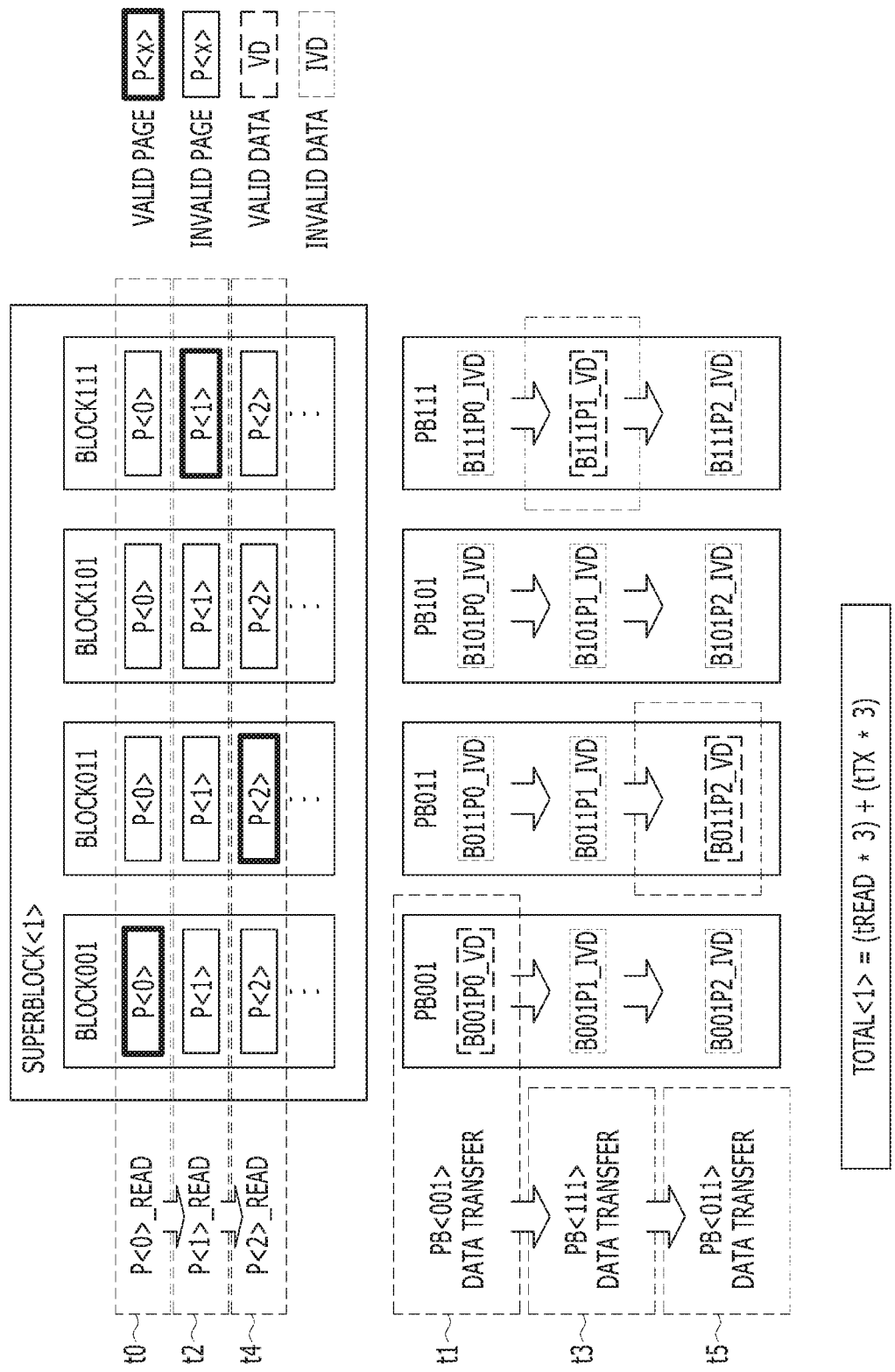

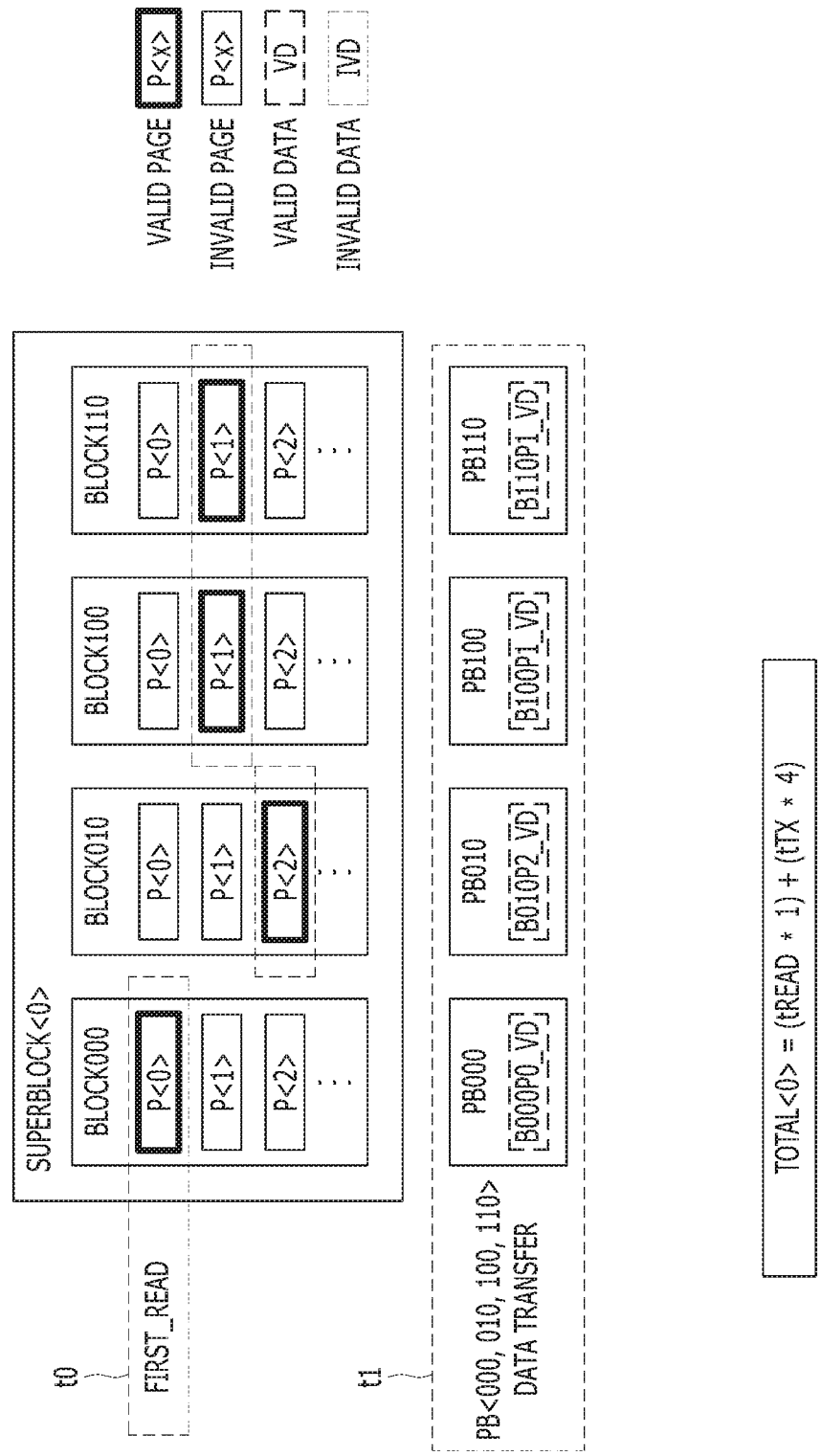

APPARATUS AND METHOD FOR PERFORMING GARBAGE COLLECTION BY PREDICTING REQUIRED TIME

CROSS-REFERENCE TO RELATED APPLICATION

This application claims priority under 35 U.S.C. § 119 to Korean Patent Application No. 10-2018-0089400, filed on Jul. 31, 2018 and Korean Patent Application No. 10-2018-0167583 filed on Dec. 21, 2018, which are incorporated herein by reference in their entirety.

BACKGROUND

1. Field

Various embodiments relate to a memory system and, more particularly, to a memory system which supports garbage collection and an operating method thereof.

2. Discussion of the Related Art

The computer environment paradigm has changed to ubiquitous computing systems that can be used anytime and anywhere. Due to this, use of portable electronic devices such as mobile phones, digital cameras, and notebook computers has rapidly increased. These portable electronic devices generally use a memory system having one or more memory devices for storing data. A memory system may be used as a main or an auxiliary storage device of a portable electronic device.

Memory systems provide excellent stability, durability, high information access speed, and low power consumption because they have no moving parts. Examples of memory systems having such advantages include universal serial bus (USB) memory devices, memory cards having various interfaces, and solid state drives (SSDs).

SUMMARY

Various embodiments are directed to a memory system capable of predictively calculating, by the unit of super block, a required time needed when extracting valid data in a block for garbage collection and selecting a victim block for garbage collection, based on predictively calculated required times, and an operating method thereof.

In an embodiment, a memory system may include: a nonvolatile memory device including a plurality of dies, each die including a plurality of planes, each plane including a plurality of blocks, each block including a plurality of pages, and further including a plurality of page buffers, each page buffer for caching data in a unit of a page to be inputted to, and outputted from, each of the blocks; and a controller suitable for managing a plurality of super blocks according to a condition, each super block including N blocks capable of being read in parallel among the blocks, generating predicted required times for the super blocks, respectively, each of the predicted required times representing a time needed to extract valid data from the corresponding super block, and selecting a victim block for garbage collection from among the blocks based on the predicted required times. N may be a natural number of 2 or greater.

When parallel read is enabled only for pages at a same position in respective N blocks in a first super block of the super blocks, the controller may generate the predicted required time corresponding to the first super block by summing a first time and a second time, the first time calculated by multiplying a number by a predicted read time, the number representing a difference between a count of valid pages of which positions are the same among the N blocks of the first super block, and a first count representing the sum of valid page counts of the N blocks and a predicted read time, the second time representing a product of the first count and a predicted transmission time, the predicted read time may be a time that is predicted to be required to cache data of the first super block in the page buffers, and the predicted transmission time may be a time that is predicted to be required to transmit the data cached in the page buffers to the controller.

When parallel read is enabled for pages at different positions in respective N blocks in a second super block of the super blocks the controller may generate the predicted required time corresponding to the second super block by summing a third time and a fourth time, the third time calculated by multiplying a largest count among valid page counts of the N blocks by a predicted read time, the fourth time calculated by multiplying a count representing the sum of the valid page counts of the N blocks by a predicted transmission time, the predicted read time may be a time that is predicted to be required to cache data of the second super block in the page buffers, and the predicted transmission time may be a time that is predicted to be required to transmit the data cached in the page buffers to the controller.

Whenever a valid page count of a block among the blocks, changes, the controller may calculate an updated predicted required time corresponding to the super block that includes the block of which the valid page count has changed.

The controller may check, at each set time, whether a block of which a valid page count has changed exists among the blocks of the super blocks, and when a block of which a valid page count has changed exists, may calculate an updated predicted required time corresponding to the super block that includes the block of which the valid page count has changed.

The controller may select, as a victim block, a block including at least one valid page among the N blocks of a super block corresponding to a lowest predicted required time among the predicted required times.

When only one superblock among the super blocks has a number of valid pages less than or equal to a set count, the controller may select N blocks of the one super block, as victim blocks, and when at least two superblocks among the super blocks each have a number of valid pages less than or equal to the set count, the controller may select, as the victim block, a block including at least one valid page among the N blocks of a super block having the lowest predicted required time among at least two predicted required times respectively corresponding to the at least two super blocks.

When the N blocks of a super block among the super blocks are selected as victim blocks and all valid data are moved to a target block, the controller may set a predicted required time corresponding to the selected super block to a specific value.

The controller may generate and may manage the predicted required times during a period in which the number of free blocks among the blocks is less than or equal to a first number, and the controller may do not manage the predicted required times during a period in which the number of free blocks among the blocks is greater than or equal to a second number, which is greater than the first number.

A first die of the plurality of dies may be coupled to a first channel, a second die of the plurality of dies may be coupled to a second channel, planes included in the first die may be coupled to a plurality of first ways which share the first channel, and planes included in the second die may be coupled to a plurality of second ways which share the second channel, and the controller may manage a first super block including a first block which is in a first plane of the first die and a second block which is in a second plane of the first die and may manage a second super block including a third block which is in a third plane of the second die and a fourth block which is in a fourth plane of the second die, according to the condition, the controller may manage a third super block including a first block which is in a first plane of the first die and a third block which is in a third plane of the second die and may manage a fourth super block including a second block which is in a second plane of the first die and a fourth block which is in a fourth plane of the second die, according to the condition, or the controller may manage a fifth super block including a first block which is in a first plane of the first die, a second block which is in a second plane of the first die, a third block which is in a third plane of the second die and a fourth block which is in a fourth plane of the second die, according to the condition.

In an embodiment, a method for operating a memory system including a controller and a nonvolatile memory device including a plurality of dies, each die including a plurality of planes, each plane including a plurality of blocks, each block including a plurality of pages, and including a plurality of page buffers, each page buffer for caching data in a unit of a page to be inputted to, and outputted from, each of the blocks, the method may include: managing a plurality of super blocks according to a set condition, each super block including N blocks capable of being read in parallel among the blocks; generating predicted required times for the super blocks, respectively, each of the predicted required times representing a time needed to extract valid data from the corresponding super block; and selecting a victim block for garbage collection from among the blocks based on the predicted required times, N may be a natural number of 2 or greater.

When parallel read is enabled only for pages at a same position in respective N blocks in a first super block among the super blocks, the generating of the predicted required times may include: calculating a first time by multiplying a number by a predicted read time, the number representing a difference between a count of valid pages of which positions are the same among the N blocks of the first super block and a first count representing the sum of valid page counts of the N blocks of the first super block and a predicted read time; calculating a second time by multiplying the first count by a predicted transmission time; generating the predicted required time for each super block by summing the first time and the second time for that super block. The predicted read time may be a time that is predicted to be required to cache data of the first super block in the page buffers, and the predicted transmission time may be a time that is predicted to be required to transmit the data cached in the page buffers to the controller.

When parallel read is enabled for pages at different positions in respective N blocks in a second super block among the super blocks, the generating of the predicted required times may include: calculating a third time by multiplying a largest count among valid page counts of the N blocks in the second super block by a predicted read time; calculating a fourth time by multiplying a count obtained by summing the valid page counts of the N blocks in the second super block by a predicted transmission time; generating the predicted required time corresponding to the second super block by summing the third time and the fourth time. The predicted read time may be a time that is predicted to be required to cache data of the second super block in the page buffers, and the predicted transmission time may be a time that is predicted to be required to transmit the data cached in the page buffers to the controller.

The method may further include: calculating, whenever a valid page count of a block among the blocks, changes, an updated predicted required time corresponding to the super block that includes the block of which the valid page count has changed.

The method may further include: checking, at each set time, whether a block of which a valid page count has changed exists among the blocks, and when a block of which a valid page count has changed exists, calculating an updated predicted required time corresponding to the super block that includes the block of which the valid page count has changed.

The selecting of the victim block may include selecting, as a victim block, a block including at least one valid page among N blocks of a super block corresponding to a lowest predicted required time among the predicted required times.

The selecting of the victim block may include: selecting, when only one super block has a number of valid pages less than or equal to a set count, N blocks of the one super block, as victim blocks; and selecting, when at least two super blocks each have a number of valid pages less than or equal to the set count, as the victim block, a block including at least one valid page among N blocks of a super block the lowest predicted required time among at least two predicted required times respectively corresponding to the at least two super blocks.

The method may further include: setting, when N number of blocks of a super block among the super blocks are selected as victim blocks and all valid data are moved to a target block, a predicted required time corresponding to the selected super block to a specific value.

The generating of the predicted required times may include: generating and managing the predicted required times during a period in which the number of free blocks among the blocks is less than or equal to a first number; and not managing the predicted required times during a period in which the number of free blocks among the blocks is greater than or equal to a second number, which is greater than the first number.

A first die of the plurality of dies may be coupled to a first channel, a second die of the plurality of dies may be coupled to a second channel, planes included in the first die may be coupled to a plurality of first ways which share the first channel, and planes included in the second die may be coupled to a plurality of second ways which share the second channel, and the set condition may include managing a super block including a first block which is in a first plane of the first die and a second block which is in a second plane of the first die and managing a super block including a third block which is in a third plane of the second die and a fourth block which is in a fourth plane of the second die, the set condition may include managing a super block including a first block which is in a first plane of the first die and a third block which is in a third plane of the second die and managing a super block including a second block which is in a second plane of the first die and a fourth block which is in a fourth plane of the second die, or the set condition may include managing a super block including a first block which is in a first plane of the first die, a second block which is in a second plane of the first die, a third block which is in a third plane of the second die and a fourth block which is in a fourth plane of the second die.

In an embodiment, a memory system may include: a memory device including a plurality of blocks, and a page buffer; and a controller suitable for: predicting data read time and data transmission time for each of a plurality of super blocks, each including a subset of blocks among the blocks; selecting a super block based on the number of valid pages, the data read times and the data transmission times for the super blocks respectively; and perform a garbage collection operation on at least one block of the selected super block, among the blocks in the selected super block; for each super block, the data read time indicates a time for reading data of valid pages stored in a block of the super block and caching the read data in the page buffer, and the data transmission time indicates a time for transmitting the cached data to the controller.

In the technology, a required time needed when extracting valid data in a block for garbage collection may be predictively calculated by the unit of super block, and a victim block for garbage collection may be selected based on predictively calculated required times.

Through this, an advantage may be provided in that a time required to perform garbage collection may be minimized.

Also, it is possible to minimize deterioration in the performance of a memory system due to performing of garbage collection.

BRIEF DESCRIPTION OF THE DRAWINGS

FIGS. 5A and 5B are diagrams illustrating garbage collection for a super memory block in a memory system in accordance with an embodiment.

FIGS. 7A and 7B are diagrams illustrating garbage collection for a super memory block in a memory system in accordance with an embodiment.

DETAILED DESCRIPTION

Figure 1:
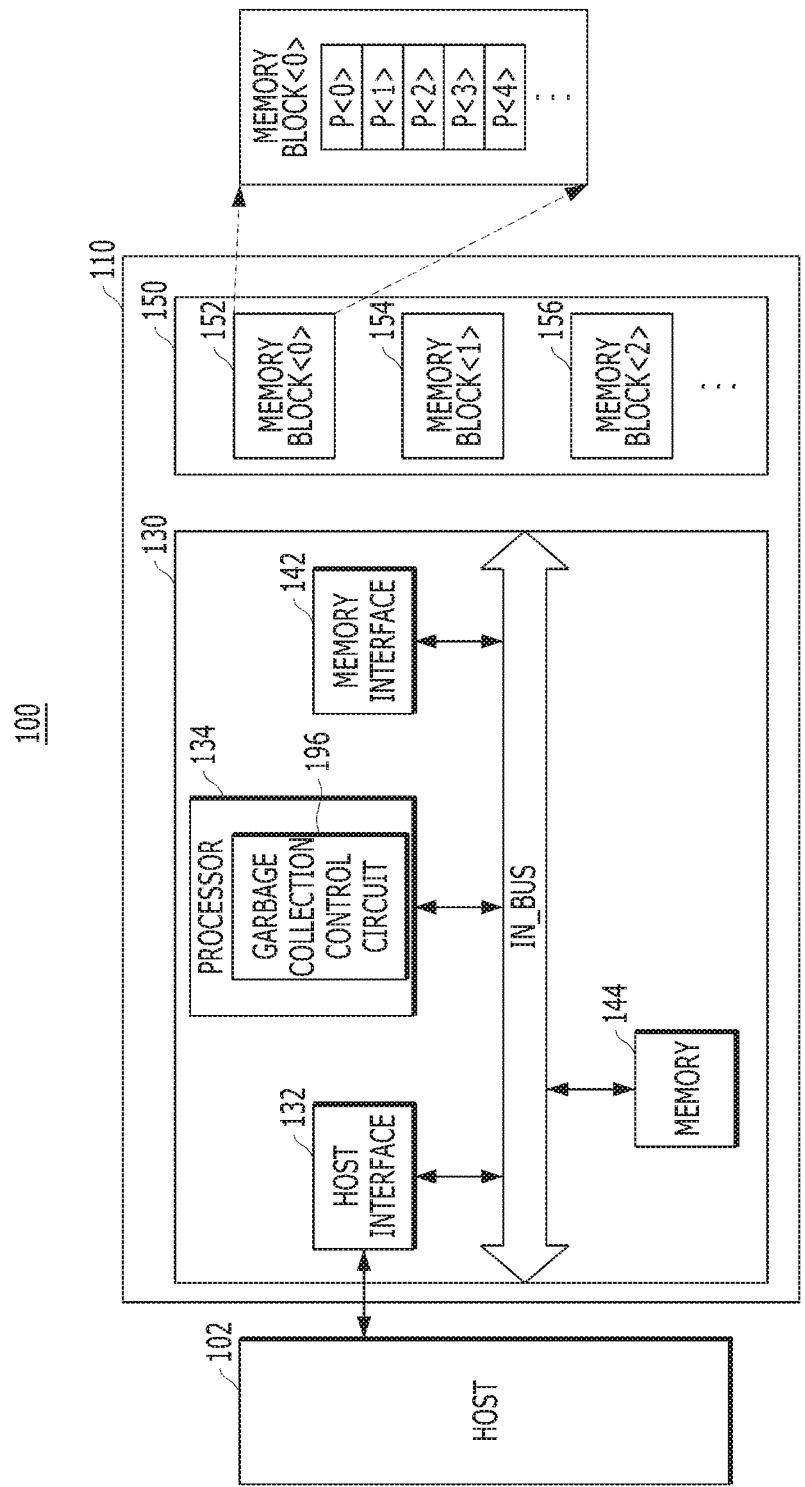
FIG. 1 is a diagram illustrating a data processing system in accordance with an embodiment.

Various embodiments are described below in more detail with reference to the accompanying drawings. The present invention may, however, be embodied in different forms and should not be construed as limited to the embodiments set forth herein. Rather, these embodiments are provided so that this disclosure is thorough and complete and fully conveys the scope of the present invention to those skilled in the art. Throughout the disclosure, like reference numerals refer to like parts throughout the various figures and embodiments of the present invention. Throughout the specification, reference to "an embodiment," "another embodiment" or the like is not necessarily to only one embodiment, and different references to any such phrase are not necessarily to the same embodiment(s).

FIG. 1 is a diagram illustrating a data processing system 100 in accordance with an embodiment.

Referring to FIG. 1, the data processing system 100 may include a host 102 and a memory system 110.

The host 102 includes electronic devices, for example, portable electronic devices such as a mobile phone, an MP3 player and a laptop computer or electronic devices such as a desktop computer, a game machine, a television (TV) and a projector, that is, wired and wireless electronic devices.

The host 102 includes at least one operating system (OS). The operating system generally manages and controls the function and operation of the host 102, and provides interoperability between the host 102 and a user using the data processing system 100 or the memory system 110. The operating system supports functions and operations corresponding to the user's purpose of use and the use of the operating system. For example, the operating system may be classified into a general operating system and a mobile operating system depending on the mobility of the host 102. Also, the general operating system may be classified into a personal operating system and an enterprise operating system depending on the user's usage environment. For example, the personal operating system characterized to support a service providing function for a general user may include Windows and Chrome, and the enterprise operating system characterized to secure and support high performance may include Windows server, Linux and Unix. In addition, the mobile operating system characterized to support a mobility service providing function and a system power saving function to users may include Android, iOS, Windows mobile, etc. The host 102 may include a plurality of operating systems, and executes the operating systems to perform operations with the memory system 110 in correspondence to a user request. The host 102 transmits a plurality of commands corresponding to a user request to the memory system 110, and accordingly, the memory system 110 performs operations corresponding to the commands, that is, operations corresponding to the user request.

The memory system 110 operates in response to a request of the host 102, in particular, stores data to be accessed by the host 102. In other words, the memory system 110 may be used as a main memory device or an auxiliary memory device of the host 102. The memory system 110 may be realized as any one of various kinds of storage devices, depending on a host interface protocol which is coupled with the host 102. For example, the memory system 110 may be realized as any one of a solid state drive (SSD), a multimedia card in the form of an MMC, an embedded MMC (eMMC), a reduced size MMC (RS-MMC) and a micro-MMC, a secure digital card in the form of an SD, a mini-SD and a micro-SD, a universal serial bus (USB) storage device, a universal flash storage (UFS) device, a compact flash (CF) card, a smart media card, or a memory stick.

The storage devices which realize the memory system 110 may be realized by a volatile memory device such as a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable and programmable ROM (EEPROM), an ferroelectric random access memory (FRAM), a phase change RAM (PRAM), a magnetic RAM (MRAM) and/or a resistive RAM (RRAM).

The memory system 110 includes a memory device 150 which stores data to be accessed by the host 102, and a controller 130 which controls storage of data in the memory device 150.

The controller 130 and the memory device 150 may be integrated into one semiconductor device to configure an SSD. In the case where the memory system 110 is used as an SSD, the operating speed of the host 102 which is coupled to the memory system 110 may be improved. In another embodiment, the controller 130 and the memory device 150 may be integrated into one semiconductor device to configure a memory card, such as a PC card (e.g., Personal Computer Memory Card International Association (PCM-CIA) card), a compact flash card (CF), a smart media card (e.g., SM and SMC), a memory stick, a multimedia card (e.g., MMC, RS-MMC and MMCmicro), a secure digital (SD) card (e.g., SD, miniSD, microSD and SDHC) and/or a universal flash storage (UFS).

In another embodiment, the memory system 110 may configure a computer, an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID (radio frequency identification) device, or one of various component elements configuring a computing system.

The memory device 150 may retain stored data even though power is not supplied. In particular, the memory device 150 stores the data provided from the host 102, through a write operation, and provides stored data to the host 102, through a read operation. The memory device 150 may include a plurality of memory blocks 152, 154 and 156. Each of the memory blocks 152, 154 and 156 may include a plurality of pages including P<0> to P<4>. Each of the pages including P<0> to P<4> may include a plurality of memory cells. The memory blocks 152, 154 and 156 include page buffers for caching data to be inputted/outputted, by the unit of a page. The memory device 150 may include a plurality of planes in each of which some of the plurality of memory blocks 152, 154 and 156 are included. The memory device 150 may include a plurality of memory dies in each of which one or more of the plurality of planes are included. The memory device 150 may be a nonvolatile memory device, for example, a flash memory, and the flash memory may have a three-dimensional (3D) stack structure.

The controller 130 controls the memory device 150 in response to a request from the host 102. For example, the controller 130 provides the data read from the memory device 150, to the host 102, and stores the data provided from the host 102, in the memory device 150. To this end, the controller 130 controls the operations of the memory device 150, such as read, write, program and erase operations.

The controller 130 includes a host interface 132, a processor 134, a memory interface 142 and a memory 144.

The host interface 132 processes the commands and data of the host 102. The host interface 132 may be configured to communicate with the host 102 through at least one of various interface protocols, such as universal serial bus (USB), multimedia card (MMC), peripheral component interconnect-express (PCI-e or PCIe), serial attached SCSI (SAS), serial advanced technology attachment (SATA), parallel advanced technology attachment (DATA), small computer system interface (SCSI), enhanced small disk interface (ESDI), integrated drive electronics (IDE) and mobile industry processor interface (MIPI). The host interface 132 may be driven through a firmware referred to as a host interface layer (HIL) being a region which exchanges data with the host 102.

The memory interface 142 serves as a memory/storage interface which performs interfacing between the controller 130 and the memory device 150. The memory interface 142 may allow the controller 130 to control the memory device 150 in response to a request from the host 102. The memory interface 142 generates control signals for the memory device 150 and processes data under the control of the processor 134. The memory interface 142 is, or functions as, a NAND flash controller (NFC) in the case where the memory device 150 is a flash memory, in particular, in the case where the memory device 150 is a NAND flash memory. The memory interface 142 may support the operation of an interface which processes a command and data between the controller 130 and the memory device 150, for example, a NAND flash interface. In particular, the memory interface 142 processes data input/output between the controller 130 and the memory device 150. The memory interface 142 may be driven through a firmware referred to as a flash interface layer (FIL) being a region which exchanges data with the memory device 150.

The memory 144, as the working memory of the memory system 110 and the controller 130, stores data for driving of the memory system 110 and the controller 130. In detail, the memory 144 stores data necessary for the controller 130 to control the memory device 150 in response to a request from the host 102. For example, the memory 144 stores data necessary when the controller 130 controls operations of the memory device 150, such as read, write, program and erase operations. The controller 130 controls an operation of providing data read from the memory device 150, to the host 102, and an operation of storing data provided from the host 102, in the memory device 150.

The memory 144 may be realized by a volatile memory. For example, the memory 144 may be realized by a static random access memory (SRAM) or a dynamic random access memory (DRAM). The memory 144 may be included in the controller 130 as illustrated in FIG. 1. In another embodiment, the memory 144 may disposed externally to the controller 130, in which case the memory 144 may be realized as an external volatile memory that exchanges data with the controller 130 through a separate memory interface (not shown).

As described above, the memory 144 stores data needed to perform data read and write operations between the host 102 and the memory device 150 and data when performing the data read and write operations. For such data storage, the memory 144 may include a program memory, a data memory, a write buffer or cache (buffer/cache), a read buffer/cache, a data buffer/cache, a map buffer/cache, and so forth.

The processor 134 controls the entire operations of the memory system 110. In particular, the processor 134 controls a program operation or a read operation for the memory device 150, in response to a write request or a read request from the host 102. The processor 134 drives firmware which is referred to as a flash translation layer (FTL), to control general operations of the memory system 110. The processor 134 may be realized by a microprocessor or a central processing unit (CPU).

For instance, the controller 130 performs an operation requested from the host 102, in the memory device 150. That is, the controller 130 performs a command operation corresponding to a command received from the host 102, with the memory device 150, through the processor 134 embodied by a microprocessor or a central processing unit (CPU). The controller 130 may perform a foreground operation as a command operation corresponding to a command received from the host 102. For example, the controller 130 may perform a program operation corresponding to a write command, a read operation corresponding to a read command, an erase operation corresponding to an erase command or a parameter set operation corresponding to a set parameter command or a set feature command as a set command.

The controller 130 may also perform a background operation for the memory device 150, through the processor 134 embodied by a microprocessor or a central processing unit (CPU). The background operation for the memory device 150 may include an operation of copying data stored in a memory block among the memory blocks 152, 154 and 156 of the memory device 150 to another memory block, for example, a garbage collection (GC) operation. In this way, because the processor 134 may control a garbage collection operation as a background operation for the memory device 150, a garbage collection control circuit 196 may be included in the processor 134. The background operation may include an operation of swapping data between one or more of the memory blocks 152, 154 and 156 of the memory device 150, for example, a wear leveling (WL) operation. The background operation may include an operation of storing map data retrieved from the controller 130 in the memory blocks 152, 154 and 156 of the memory device 150, for example, a map flush operation. The background operation may include a bad management operation for the memory device 150, which may include checking for and processing a bad block among the plurality of memory blocks 152, 154 and 156 in the memory device 150.

Within the processor 134 of the controller 130, a component for performing bad management for the memory device 150 may be included. Such component performs bad block management of checking for a bad block among the plurality of memory blocks 152, 154 and 156 and processing the identified bad block as a bad. Through bad block management, a memory block where a program fail has occurred is processed as a bad memory block, and program-failed data is written in a new memory block. The bad management may be performed in case where a program fail may occur when performing data write (or program), due to the characteristic of the memory device 150 (e.g., a NAND flash memory).

Figure 2:
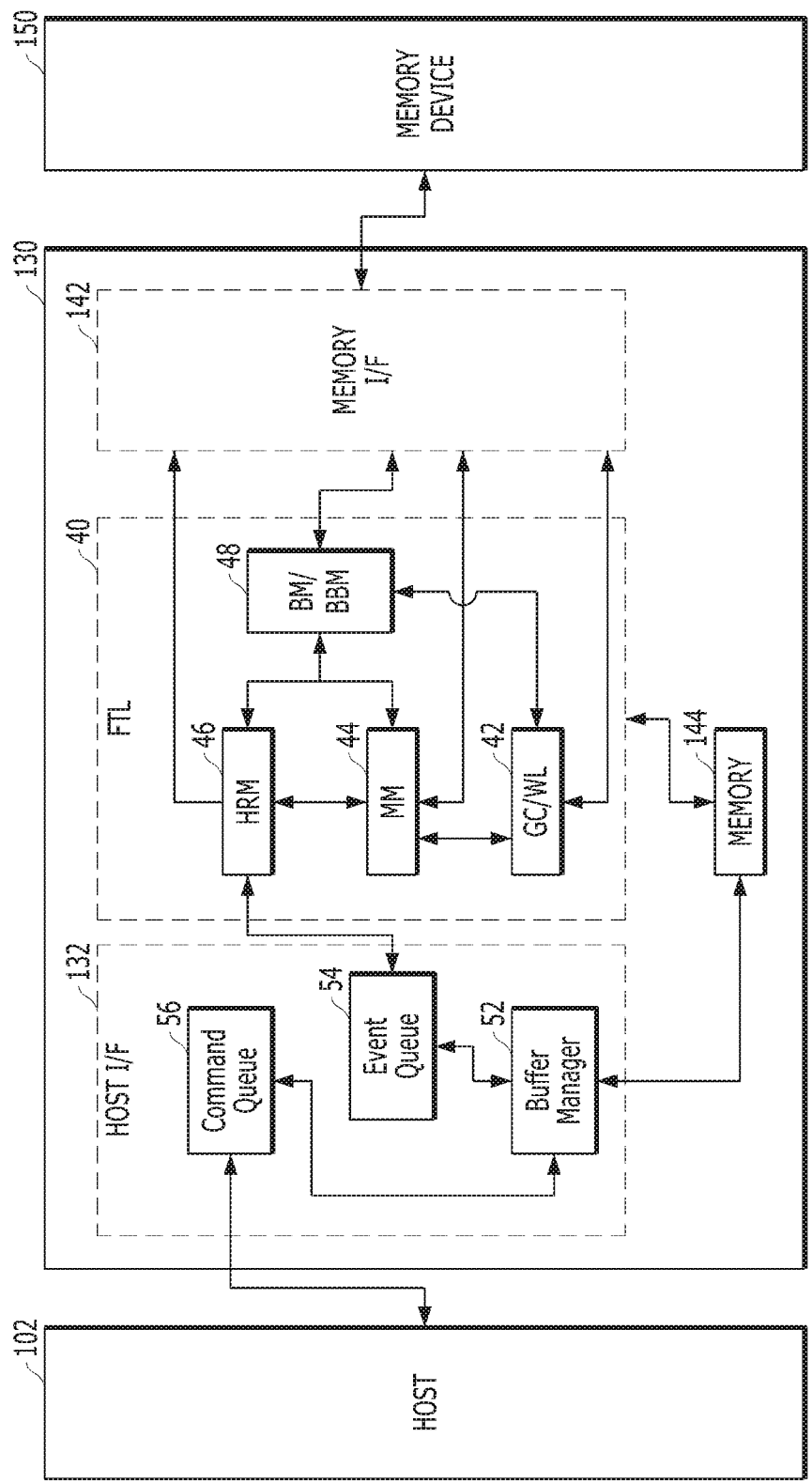
FIG. 2 is a diagram illustrating a controller of a memory system in accordance with an embodiment.

FIG. 2 is a diagram illustrating a controller, e.g., that shown in FIG. 1, of a memory system in accordance with an embodiment.

Referring to FIG. 2, the controller 130 cooperates with the host 102 and the memory device 150. The controller 130 may include a host interface (I/F) 132, a flash translation layer (FTL) 40, a memory interface 142 and a memory 144.

The host interface 132 handles commands and data, which are received from the host 102. By way of example but not limitation, the host interface 132 may include a buffer manager 52, an event queue 54, and a command queue 56. The command queue 56 may sequentially store the commands and the data and output the commands and the data to the buffer manager 52 in a an order in which they are stored in the command queue 56. The buffer manager 52 may classify, manage or adjust the commands and the data, which are delivered from the command queue 56. The event queue 54 may sequentially transmit events for processing the commands and the data, which are received from the buffer manager 52.

The memory system 110 may receive a plurality of commands or data having the same characteristic, or a plurality of commands and data having different characteristics after being mixed or jumbled. For example, the memory system 110 receives a plurality of commands for reading data (i.e., read commands), or alternatively receives a plurality of commands for reading data (i.e., read commands) and programming/writing data (i.e., write commands). The host interface 132 may store commands and data, which are received from the host 102, to the command queue 56 sequentially. Thereafter, the host interface 132 may estimate or predict what kind of operation the controller 130 will perform according to the characteristics of the command and data. The host interface 132 may determine a processing order and a priority of commands and data, based at least on their characteristics. According to characteristics of commands and data, the buffer manager 52 may determine whether storing commands and data in the memory 144, or whether delivering the commands and the data into the flash translation layer 40. The event queue 54 receives events, entered from the buffer manager 52, which are to be internally executed and processed by the memory system 110 or the controller 130 in response to the commands and the data, so as to deliver the events into the flash translation layer 40 in the order received.

In accordance with an embodiment, the flash translation layer 40 may include a state manager 42, a map manager (MM) 44, a host request manager (HRM) 46, and a block manager 48. The host request manager 46 may manage the events entered from the event queue 54. The map manager 44 may handle or control a map data. The state manager 42 may perform garbage collection (GC) or wear leveling (WL). The block manager 48 may execute commands or instructions onto a block in the memory device 150.

By way of example but not limitation, the host request manager 46 may use the map manager 44 and the block manager 48 to handle or process requests according to the read and program commands and events which are delivered from the host interface 132. The host request manager 46 may send an inquiry request to the map data manager 44, to figure out a physical address corresponding to a logical address which is entered with the events. The host request manager 46 may transmit a read request with the physical address to the memory interface 142, to process the read request (or handle the events). On the other hand, the host request manager 46 may transmit a program request (or write request) to the block manager 48, to program data to a specific free page (i.e., a page having no data) in the memory device 150. Further, the host request manager 46 may transmit a map update request corresponding to the program request to the map manager 44, to update an item relevant to the programmed data in mapping information. The mapping information may indicate a mapping relation between logical addresses and physical addresses.

The block manager 48 may convert a program request, which is delivered from the host request manager 46, the map data manager 44, and/or the state manager 42, into a flash program request used for the memory device 150, to manage flash blocks in the memory device 150. In order to maximize or enhance program or write performance of the memory system 110, the block manager 48 may collect program requests and send flash program requests for multiple-plane and one-shot program operations to the memory interface 142. The block manager 48 may send several flash program requests to the memory interface 142 to enhance or maximize parallel processing of a multi-channel and multi-directional flash controller.

On the other hand, the block manager 48 may manage blocks of the memory device 150 according to the number of valid pages. Further, the block manager 48 may select and erase blocks having no valid pages when a free block is needed, and select a block including the least number of valid pages when it is determined that garbage collection is necessary. The state manager 42 may perform garbage collection to move the valid data to an empty block and erase the blocks that used to contain the valid data so that the block manager 48 may have enough free blocks (i.e., empty blocks with no data). If the block manager 48 provides information regarding a block to be erased to the state manager 42, the state manager 42 may check all flash pages of the block to be erased to determine whether each page is valid. For example, to determine validity of each page, the state manager 42 may identify a logical address stored in an out-of-band (00B) area of each page. To determine whether each page is valid, the state manager 42 may compare the physical address of the page with the physical address mapped to the logical address obtained from the inquiry request. The state manager 42 sends a program request to the block manager 48 for each valid page. A mapping table may be updated through the update of the map manager 44 when the program operation is completed.

The map manager 44 may manage a logical-to-physical mapping table. The map manager 44 may process requests such as queries and updates, which are generated by the host request manager 46 or the state manager 42. The map manager 44 may store the entire mapping table in the memory device 150 and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks exceeds a certain threshold, the map manager 44 may transmit a program request to the block manager 48 so that a clean cache block is made as well as the dirty mapping table may be stored in the memory device 150.

On the other hand, when garbage collection is performed, the state manager 42 copies valid page(s) into a free block, and the host request manager 46 may program the latest version of the data for the same logical address of the page and currently issue an update request. When the state manager 42 requests the map update in a state in which copying of valid page(s) is not completed normally, the map manager 44 may not perform a map update (i.e., an update of the mapping table). This is because the map request is issued with old physical information if the state manger 42 requests a map update and a valid page copy is completed later. The map manager 44 may perform a map update to ensure accuracy only if the latest map table still points to the old physical address.

In accordance with an embodiment, at least one of the block manager 48, the map manager 44, and the state manager 42 of FIG. 2, may include a garbage collection control circuit 196 described later in FIG. 3.

The memory device 150 may include a plurality of memory blocks. Each of the plurality of memory blocks may be implemented as any of various types, such as a single level cell (SLC) memory block and a multi level cell (MLC) memory block, according to the number of bits that can be stored or represented in one memory cell of that memory block. The SLC memory block includes a plurality of pages implemented by memory cells, each storing one bit of data. The SLC memory block may have high performance of data input and output (I/O) operation and high durability. The MLC memory block includes a plurality of pages implemented by memory cells, each storing multi-bit data (e.g., two bits or more). The MLC memory block may have larger storage capacity in the same space than the SLC memory block. The MLC memory block may be highly integrated in terms of storage capacity. In an embodiment, the memory device 150 may be implemented with MLC memory blocks such as an MLC memory block, a triple level cell (TLC) memory block, a quadruple level cell (QLC) memory block and a combination thereof. The MLC memory block may include a plurality of pages implemented by memory cells, each capable of storing 2-bit data. The triple level cell memory block may include a plurality of pages implemented by memory cells, each capable of storing 3-bit data. The quadruple level cell memory block may include a plurality of pages implemented by memory cells, each capable of storing 4-bit data. In another embodiment, the memory device 150 may be implemented with a block including a plurality of pages implemented by memory cells, each capable of storing 5-bit data or more.

In an embodiment of the disclosure, the memory device 150 is embodied as a nonvolatile memory for example as a flash memory, such as a NAND flash memory and a NOR flash memory. However, the memory device 150 may be implemented by at least one of a phase change random access memory (PCRAM), a ferroelectrics random access memory (FRAM) and a spin transfer torque magnetic random access memory (STT-RAM or STT-MRAM).

Figure 3:
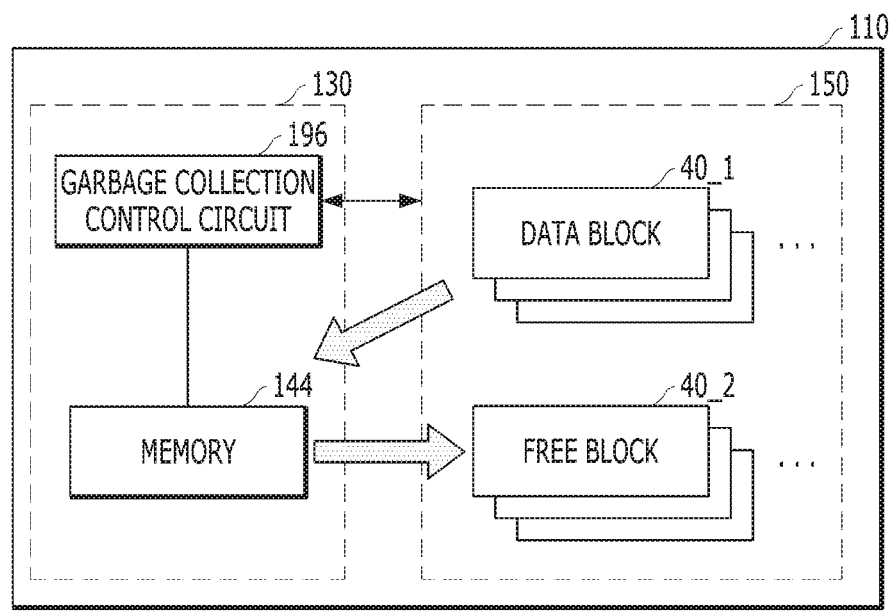
FIG. 3 is a diagram illustrating an example of garbage collection used in a memory system in accordance with an embodiment.

FIG. 3 is a diagram illustrating an example of garbage collection (GC) used in a memory system in accordance with an embodiment.

Referring to FIG. 3, an example of garbage collection is illustrated in the context of the memory system 110 including the controller 130 and the memory device 150 as shown in FIG. 2. An automatic garbage collection may be performed by the memory system 110 without external commands or instructions (e.g., without a command from a host 102 of FIG. 2). A manual garbage collection may be carried out in response to external commands or instructions.

The controller 130 may read user data from a plurality of data blocks 40_1 of the memory device 150 and store the user data in the memory 144 of the controller 130. The user data may be programmed in at least one free block 40_2 by the controller 130. The plurality of data blocks 40_1 may include a closed block that cannot be programmed with data any more. In accordance with an embodiment, the memory 144 may be disposed externally to the controller 130 and coupled with the controller 130.

Specifically, the garbage collection control circuit 196 of the controller 130 may select at least one of the plurality of data blocks 40_1 as a target block. The garbage collection control circuit 196 may search for the target block and extract valid data from the target block. The garbage collection control circuit 196 may copy the extracted valid data to the free block 40_2, which is erased and ready to be programmed with data. Data determined to be no longer valid in the target block may be discarded, and may not be copied to the free block 40_2. After all valid data previously stored in the target block are copied to the free block 40_2, the controller 130 considers that the target block 40_1 has no more valid data and that any data therein may be erased. Thus, when any block to be programmed with new data is required, all the data stored in the target block can be erased and the target block used to store the new data.

In accordance with an embodiment, the controller 130 may use the memory 144 to temporarily store valid data selected from the target block until the valid data are programmed into the free block 402.

For garbage collection, the controller 130 should distinguish valid data from invalid data in a target block. The information on the effective page count (VPC) corresponding to each data block 40_1 may indicate the amount of the valid data or valid pages in each data block 40_1, but may not show which data or which page in each data block 40_1 is valid or not. Therefore, the controller 130 may need to utilize the number of valid pages and operation information including a map data to determine or confirm which data or which page is valid or not. In an embodiment, when a valid data to be stored in the free block 40_2 is easily distinguished for garbage collection, resources (e.g., time and power) required for garbage collection may be reduced.

The plurality of blocks 40_1 and 40_2 in the memory device 150 may store a large amount of data. In accordance with an embodiment, the controller 130 may divide each block into a plurality of unit blocks in order to more efficiently control and manage the plurality of blocks 40_1 and 40_2. When a single block is divided into a plurality of unit blocks, the controller 130 may generate map data (e.g., a logical-to-physical (L2P) table, or a physical-to-logical (P2L) table) for each unit block.

In accordance with an embodiment, various number of unit blocks may be included in a single block. By way of example but not limitation, the number of unit blocks included in a single block may depend at least on the structure of the memory device 150, the size of the map data, or the location of the map data. In an embodiment, each block in the memory device 150 may be programmed with data in a single-page unit or a multi-page unit. At this time, the size of data that can be stored in each page may be varied according to the structure of unit cells or cell strings in each block. When a map data is generated in a bitmap format, an area corresponding to one or more times the size of the map data may be determined as the size of the unit block.

Data may be sequentially programmed from the first page to the last page in the data block 40_1. When data is programmed on the last page of a block, the block is changed from an open state where new data can be programmed to a closed state in which the new data can no longer be programmed. In accordance with an embodiment, when a specific block among the data blocks 40_1 becomes a closed state, the garbage collection control circuit 196 may compare the number of map data regarding the data stored in the unit block of the corresponding block with the number of valid pages to determine the validity of the data stored in the corresponding block.

Specifically, when the data block 40_1 of the memory device 150 is in the closed state, the controller 130 may compare the number of valid pages with the sum of map data for plural unit blocks. If the number of valid pages and the sum of the map data for a specific block are not matched with each other, it could be presumed that the specific block includes some invalid or unnecessary map data. The controller 130 may check whether the map data corresponding to the data stored in the specific block is valid. When there is map data that is no longer valid, the controller 130 may delete or invalidate invalid map data to update the map data.

In accordance with an embodiment, the garbage collection control circuit 196 may determine whether to designate a target block for garbage collection based on the ratio of the sum of map data for a plurality of unit blocks in a corresponding block divided by the number of pages in the corresponding block. In various embodiments, the number of pages in a block may be a fixed value determined by circuit design and manufacturing procedures of the memory device 150. The number of pages may represent the maximum amount of valid data that can be stored in the block. When a specific block is divided into a plurality of unit blocks and map data are generated for each unit block, the sum of map data for a plurality of unit blocks in the corresponding block may indicate the amount of valid data in the corresponding block. Therefore, the garbage collection control circuit 196 may recognize which block stores more valid data than another block, based on the ratio of the sum of the map data for the plurality of unit blocks in one block divided by the number of pages in the corresponding block. As the ratio regarding a block is lower, the garbage collection control circuit 196 may prioritize a block having a lower ratio as a target block for garbage collection. In addition, the garbage collection control circuit 196 may determine whether to select a block as the target block for the garbage collection depending on whether the ratio is within a set range or is below a threshold.

In the embodiments above-described, the controller 130 may search for valid data in a target block among a plurality of data blocks 40_1 for garbage collection. At this time, the controller 30 does not search for valid data in every data block 40_1 in the memory device 150, but instead may search for valid data only in data blocks 40_1 having a number of unit blocks within a set range. In this case, it is possible to reduce resources (e.g., time and power) required for searching for valid data to be stored in the free block 40_2 during the garbage collection.

The search for valid pages may be relevant to a sub-operation of garbage collection. The search for valid pages and the search for target blocks may be a key factor for managing the consumed time of garbage collection in a memory system. A method and an apparatus for performing the garbage collection would support the search for valid pages and the search for target blocks. Herein, the garbage collection may include an operation for searching for an area (e.g., a block) in which a dynamically allocated memory area is no longer usable or needlessly occupied, and erasing data stored in the corresponding area to prepare for programming new data. The time required to erase data contained in a specific area of a nonvolatile memory device may vary depending on cell structure or cell characteristics of the nonvolatile memory device. On the other hand, the time required to search for an area to be erased in the nonvolatile memory device may vary depending on a method and an apparatus for controlling the nonvolatile memory device in accordance with various embodiments.

Figure 4:
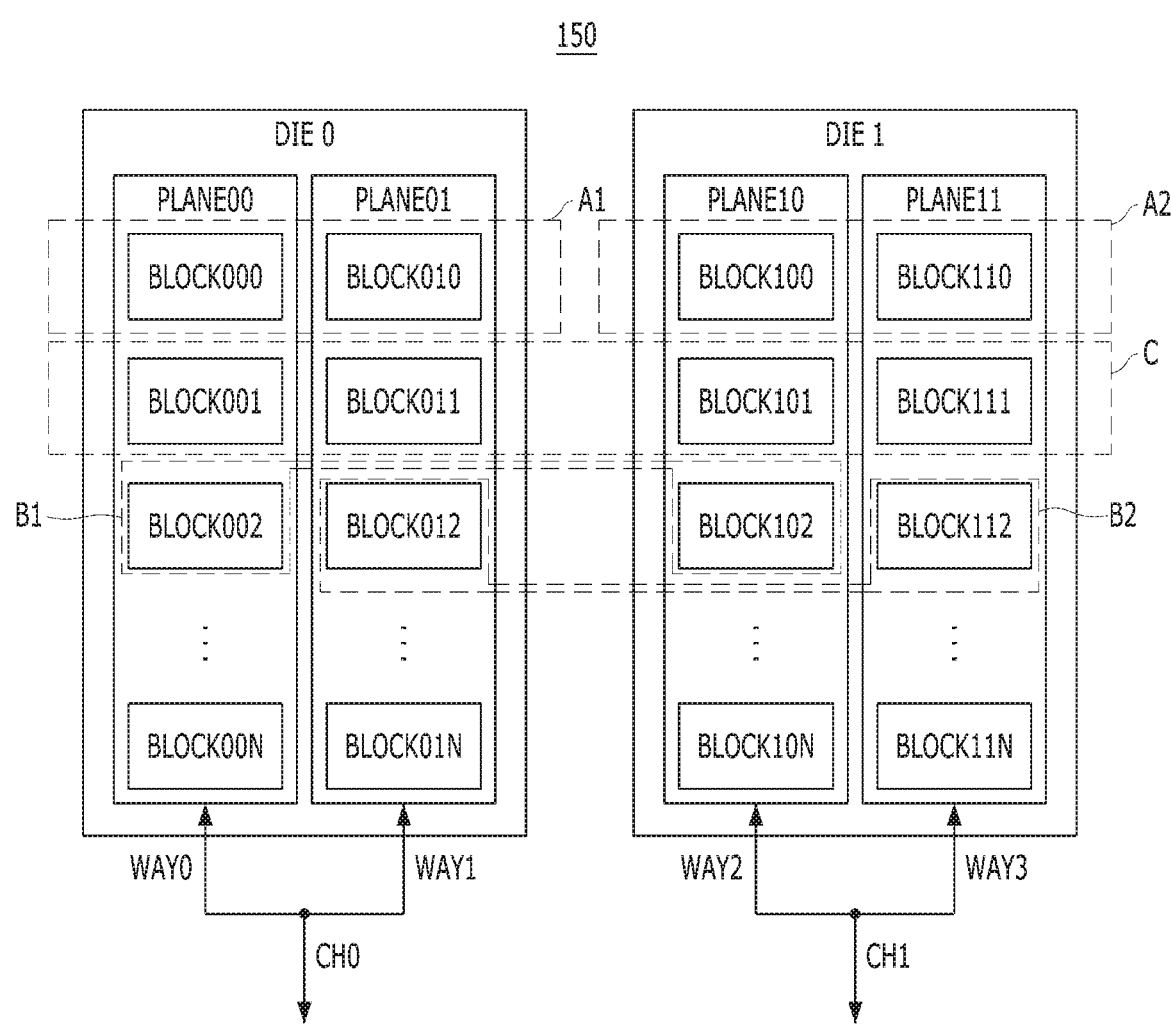
FIG. 4 is a diagram illustrating the concept of a super memory block used in a memory system in accordance with an embodiment.

FIG. 4 is a diagram illustrating the concept of a super memory block used in a memory system in accordance with an embodiment.

Referring to FIG. 4, the memory device 150 may include a plurality of dies, which may include a plurality of planes, which may include a plurality of memory blocks.

The memory device 150 includes a plurality of memory blocks BLOCK000 to BLOCK00N, BLOCK010 to BLOCK01N, BLOCK100 to BLOCK10N, and BLOCK110 to BLOCK11N.

The memory device 150 includes a zeroth memory die DIE0 capable of inputting and outputting data through a zeroth channel CH0 and a first memory die DIE1 capable of inputting and outputting data through a first channel CH1. The zeroth channel CH0 and the first channel CH1 may input and output data in an interleaving scheme.

The zeroth memory die DIE0 includes a plurality of planes PLANE00 and PLANE01 respectively corresponding to a plurality of ways WAY0 and WAY1 capable of inputting and outputting data in the interleaving scheme by sharing the zeroth channel CH0.

The first memory die DIE1 includes a plurality of planes PLANE10 and PLANE11 respectively corresponding to a plurality of ways WAY2 and WAY3 capable of inputting and outputting data in the interleaving scheme by sharing the first channel CH1.

The first plane PLANE00 of the zeroth memory die DIE0 includes a set or predetermined number of memory blocks BLOCK000 to BLOCK00N, among all of the plurality of memory blocks BLOCK000 to BLOCK00N, BLOCK010 to BLOCK01N, BLOCK100 to BLOCK10N, and BLOCK110 to BLOCK11N.

The second plane PLANE01 of the zeroth memory die DIE0 includes the set or predetermined number of memory blocks BLOCK010 to BLOCK01N, among all of the plurality of memory blocks.

The first plane PLANE10 of the first memory die DIE1 includes the set or predetermined number of memory blocks BLOCK100 to BLOCK10N, among all of the plurality of memory blocks.

The second plane PLANE11 of the first memory die DIE1 includes the set or predetermined number of memory blocks BLOCK110 to BLOCK11N, among all of the plurality of memory blocks.

In this manner, the plurality of memory blocks of the memory device 150 may be divided according to physical positions such that blocks in the same plane use the same way and blocks in the same die use the same channel.

While it is illustrated in FIG. 4 that the memory device 150 includes two dies, each of which include two planes, this is merely an example. The number of memory dies in the memory device 150 may be any suitable number based on design and operational considerations, and the number of planes in each memory die may likewise be different than in the example shown in FIG. 4. Of course, the set or predetermined number of memory blocks in each plane also may be different depending on design and operational considerations.

Also, different from dividing the memory blocks according to physical positions, in another embodiment, the controller 130 may use a scheme of dividing the memory blocks according to simultaneous selection and operation of memory blocks. That is, the controller 130 may manage a plurality of memory blocks by grouping memory blocks capable of being selected simultaneously and thereby dividing the plurality of memory blocks into super memory blocks.

The plurality of memory blocks grouped into super memory blocks by the controller 130 may be divided according to various schemes depending on design considerations. For example, three schemes will be described herein.

In accordance with a first scheme, for example, the controller 130 may generate and manage one super memory block A1 in the memory device 150 by grouping one memory block BLOCK000 in the first plane PLANE00 of the zeroth memory die DIE0 and one memory block BLOCK010 in the second plane PLANE01 of the zeroth memory die DIE0. When applying the first scheme to the first memory die DIE1, the controller 130 may generate and manage one super memory block A2 by grouping one memory block BLOCK100 in the first plane PLANE10 and one memory block BLOCK110 in the second plane PLANE11.

In accordance with a second scheme, the controller 130 may generate and manage one super memory block B1 to include memory block BLOCK002 in the first plane PLANE00 of the zeroth memory die DIE0 and one memory block BLOCK102 in the first plane PLANE10 of the first memory die DIE1. When applying the second scheme again, the controller 130 may generate and manage one super memory block B2 by grouping one memory block BLOCK012 in the second plane PLANE01 of the zeroth memory die DIE0 and one memory block BLOCK 12 in the second plane PLANE11 of the first memory die DIE1. Thus, while the first scheme groups two memory blocks from two different planes in the same die into a super block, the second scheme groups one block from each of the different dies into a super block. The methodology of either scheme may be extended to apply to arrangements of more than two dies and more than two planes in a die.

In accordance with a third scheme, the controller 130 may generate and manage one super memory block C by grouping one memory block BLOCK001 in the first plane PLANE00 of the zeroth memory die DIE0, one memory block BLOCK011 in the second plane PLANE01 of the zeroth memory die DIE0, one memory block BLOCK101 in the first plane PLANE10 of the first memory die DIE1, and one memory block BLOCK111 included in the second plane PLANE11 of the first memory die DIE1. Thus, in accordance with the third scheme, two blocks, from each plane in each die, are grouped to form a super block. The third scheme may also be extended to apply to more complex die/plane arrangements, as is further described below.

Memory blocks capable of being selected simultaneously by being included in the same super memory block may be selected substantially simultaneously through an interleaving scheme. For example, the interleaving scheme may include a channel interleaving scheme, a memory die interleaving scheme, a memory chip interleaving scheme or a way interleaving scheme.

First Embodiment

FIGS. 5A and 5B are diagrams illustrating garbage collection for a super memory block in a memory system in accordance with an embodiment.

It may be seen that the embodiment of FIGS. 5A and 5B the controller 130 uses the third scheme described above for dividing memory blocks into super memory blocks.

Referring to FIGS. 5A and 5B, the controller 130 manages each of super memory blocks SUPER BLOCK<0> and SUPER BLOCK<1> by selecting one memory block in each of four planes PLANE<00, 01, 10, 11> of the memory device 150. Therefore, four memory blocks are included in each of the super memory blocks SUPER BLOCK<0> and SUPER BLOCK<1>.

For example, referring to FIGS. 4 and 5A, the first super memory block SUPER BLOCK<0> is defined (or generated) by grouping the first memory block BLOCK000, the first memory block BLOCK010, the first memory block BLOCK100 and the first memory block BLOCK110. The first memory block BLOCK000 is in the first plane PLANE00 of the first memory die DIE0. The first memory block BLOCK010 is in the second plane PLANE01 of the first memory die DIE0. The first memory block BLOCK100 is in the first plane PLANE10 of the second memory die DIE1. The first memory block BLOCK110 is in the second plane PLANE11 of the second memory die DIE1.

Referring to FIGS. 4 and 5B, the second super memory block SUPER BLOCK<1> is defined (or generated) by grouping the second memory block BLOCK001, the second memory block BLOCK011, the second memory block BLOCK101 and the second memory block BLOCK111. The second memory block BLOCK001 is in the first plane PLANE00 of the first memory die DIE0. The second memory block BLOCK011 is in the second plane PLANE01 of the first memory die DIE0. The second memory block BLOCK101 is in the first plane PLANE10 of the second memory die DIE1. The second memory block BLOCK111 is in the second plane PLANE11 of the second memory die DIE1.

As shown in FIGS. 5A and 5B, each of the super memory blocks SUPER BLOCK<0, 1> may input and output data of page unit by selecting in parallel the four memory blocks BLOCK<000, 010, 100, 110> or BLOCK<001, 011, 101, 111> included therein.

In this regard, it may be assumed that each of the super memory blocks SUPER BLOCK<0, 1> is able to read in parallel only pages of the same position when selecting in parallel the four memory blocks BLOCK<000, 010, 100, 110> or BLOCK<001, 011, 101, 111> included therein.

In FIG. 5A, that the first super memory block SUPER BLOCK<0> selects in parallel the four memory blocks BLOCK<000, 010, 100, 110> means that pages of the same position are simultaneously selected in the four memory blocks BLOCK<000, 010, 100, 110>. That is to say, the first super memory block SUPER BLOCK<0> simultaneously selects first pages P<0> or second pages P<1> of the four respective memory blocks BLOCK<000, 010, 100, 110>. This also means that the first super memory block SUPER BLOCK<0> cannot simultaneously select pages at different positions, such as first pages P<0> in the first and second memory blocks BLOCK<000, 010> and second pages P<1> in the third and fourth memory blocks BLOCK<100, 110>.

In FIG. 5B, that the second super memory block SUPER BLOCK<1> selects in parallel the four memory blocks BLOCK<001, 011, 101, 111> means that pages of the same position are simultaneously selected in the four memory blocks BLOCK<001, 011, 101, 111>. That is to say, the second super memory block SUPER BLOCK<1> simultaneously selects third pages P<2> or fourth pages P<3> of the four respective memory blocks BLOCK<001, 011, 101, 111>. This also means that the second super memory block SUPER BLOCK<1> cannot simultaneously select pages of different positions, such as third pages P<2> in the first and second memory blocks BLOCK<001, 011> and fourth pages P<3> in the third and fourth memory blocks BLOCK<101, 111>.

In FIGS. 5A and 5B, each of the plurality of pages in each of the four memory blocks BLOCK<000, 010, 100, 110> and the four memory blocks BLOCK<001, 011, 101, 111> may be a valid page (VALID PAGE) or an invalid page (INVALID PAGE). Whether a particular page is valid or invalid is independent of whether any other page is valid or invalid.

For example, in the first super memory block SUPER BLOCK<0> of FIG. 5A, only the first pages P<0> of the first to third memory blocks BLOCK<000, 010, 100> (as shown by bolded boxes) may be valid pages and all the other pages may be invalid pages (as shown by non-bolded boxes).

In the second super memory block SUPER BLOCK<1> of FIG. 5B, only the first page P<0> of the first memory block BLOCK001, the third page P<2> of the second memory block BLOCK011 and the second page P<1> of the fourth memory block BLOCK111 may be valid pages and all the other pages may be invalid pages.

Each of the first super memory block SUPER BLOCK<0> of FIG. 5A and the second super memory block SUPER BLOCK<1> of FIG. 5B includes three valid pages.

In FIGS. 5A and 5B, the four memory blocks BLOCK<000, 010, 100, 110> and the four memory blocks BLOCK<001, 011, 101, 111> of the super memory blocks SUPER BLOCK<0, 1> may be respectively selected as victim blocks for garbage collection.

When the first super memory block SUPER BLOCK<0> of FIG. 5A is selected as a victim block for garbage collection, a time needed to extract data from the three valid pages of the four memory blocks BLOCK<000, 010, 100, 110> may be defined as a first required time TOTAL<0>. When the second super memory block SUPER BLOCK<1> of FIG. 5B is selected as a victim block for garbage collection, a time needed to extract data from the three valid pages of the four memory blocks BLOCK<001, 011, 101, 111> may be defined as a second required time TOTAL<1>.

The first required time TOTAL<0> and the second required time TOTAL<1> may be substantially different for the reasons set forth below.

In order to extract data from the three valid pages of the four memory blocks BLOCK<000, 010, 100, 110>, by selecting the first super memory block SUPER BLOCK<0> of FIG. 5A as a victim block, the positions of the three valid pages may be determined.

As a result, in the first super memory block SUPER BLOCK<0> of FIG. 5A, only the first pages P<0> of the first to third memory blocks BLOCK<000, 010, 100> are valid pages and all the other pages are invalid pages.

According to the determination result of FIG. 5A, the three valid pages of the first super memory block SUPER BLOCK<0> have the same positions in their respective blocks. With this arrangement, only one read P<0>_READ is needed to extract valid data from the three valid pages.

Therefore, the controller 130 performs the one read P<0>_READ for the first pages P<0> of the four memory blocks BLOCK<000, 010, 100, 110>, at a zeroth time t0. Through this read P<0>_READ, four pages of data B000P0_VD, B010P0_VD, B100P0_VD and B110P0_IVD are cached in four page buffers PB<000, 010, 100, 110>, respectively. At a first time t1, the controller 130 selects only the three pages having valid data B000P0_VD, B010P0_VD and B100P0_VD among the four pages of data B000P0_VD, B010P0_VD, B100P0_VD and B110P0_IVD cached in the page buffers PB<000, 010, 100, 110>, and transmits the selected three pages of valid data to the memory 144 (DATA TRANSFER). At the first time t1, the controller 130 does not transmit, to the memory 144, the one page of invalid data B110P0_IVD at the zeroth time t0. Rather, the controller 130 discards the invalid data.

In this way, the controller 130 may extract all the valid data B000P0_VD, B010P0_VD and B100P0_VD stored in the three valid pages of the first super memory block SUPER BLOCK<0>, through one read P<0>_READ.

Herein, a time needed to perform the one read P<0>_READ may be denoted as a read time tREAD. Moreover, a time needed to transmit one page of data B000P0_VD, B010P0_VD or B100P0_VD stored in one page buffer PB<000>, PB<010> or PB<100> to the memory 144 may be denoted as a transmission time tTX. Thus, the first required time TOTAL<0> needed to extract data by selecting the first super memory block SUPER BLOCK<0> may be "{(tREAD*1)+(tTX*3)}", where tREAD is a read time and tTX is a transmission time. For example, when the read time tREAD is 50 us and the transmission time tTX is 10 us, the first required time TOTAL<0> is 80 us.

In order to extract data from the three valid pages of the four memory blocks BLOCK<001, 011, 101, 111>, by selecting the second super memory block SUPER BLOCK<1> of FIG. 5B as a victim block, the positions of the three valid pages may be determined.

As a result, in the second super memory block SUPER BLOCK<1>, only the first page P<0> of the first memory block BLOCK001, the third page P<2> of the second memory block BLOCK011 and the second page P<1> of the fourth memory block BLOCK111 are valid pages and all the other pages are invalid pages.

According to the determination result, the three valid pages of the second super memory block SUPER BLOCK<1> are not at the same positions in their respective blocks. Consequently, to extract valid data from the three valid pages, it is necessary to perform three reads P<0>_READ, P<1>_READ and P<2>_READ.

Therefore, the controller 130 performs the first read P<0>_READ for the first pages P<0> of the four memory blocks BLOCK<001, 011, 101, 111>, at a zeroth time t0. Through the first read P<0>_READ, four pages of data B001P0_VD, B011P0_IVD, B101P0_IVD and B111P0_IVD are cached in four page buffers PB<001, 011, 101, 111>, respectively. At a first time t1, the controller 130 selects only the one page having valid data B001P0_VD among the four pages of data B001P0_VD, B011P0_IVD, B101P0_IVD and B111P0_IVD cached in the page buffers PB<001, 011, 101, 111>, and transmits the selected one page of valid data to the memory 144 included therein. At this time, the controller 130 does not transmit, to the memory 144, the three pages of invalid data B011P0_IVD, B101P0_IVD and B111P0_IVD. Rather, the controller 130 discards the three pages of invalid data.

In this way, the controller 130 may extract the one page of valid data B001P0_VD stored in BLOCK001_P<0> of the second super memory block SUPER BLOCK<1>, through the first read P<0>_READ.

Next, the controller 130 performs the second read P<1>_READ for the second pages P<1> of the four memory blocks BLOCK<001, 011, 101, 111>, at a second time t2. Through the second read P<1>_READ, four pages of data B001P1_IVD, B011P1_IVD, B101P1_IVD and B111P1_VD are cached in the four page buffers PB<001, 011, 101, 111>. At a third time t3, the controller 130 selects only the one page of valid data B111P1_VD among the four pages of data B001P1_IVD, B011P1_IVD, B101P1_IVD and B111P1_VD cached in the page buffers PB<001, 011, 101, 111>, and transmits the selected page of valid data to the memory 144. At this time, the controller 130 does not transmit, to the memory 144, the three pages of invalid data B001P1_IVD, B011P1_IVD and B101P1_IVD. Rather, the controller 130 discards the three pages of invalid data.

In this way, the controller 130 may extract the one page of valid data B111P1_VD stored in the one valid page BLOCK111_P<1> of the second super memory block SUPER BLOCK<1>, through the second read P<1>_READ.

Subsequently, the controller 130 performs the third read P<2>_READ for the third pages P<2> of the four memory blocks BLOCK<001, 011, 101, 111>, at a fourth time t4. Through the third read P<2>_READ, four pages of data B001P2_IVD, B011P2_VD, B101P2_IVD and B111P2_IVD are cached in the four page buffers PB<001, 011, 101, 111>. At a fifth time t5, the controller 130 selects only the one page of valid data B011P2_VD among the four page data B001P2_IVD, B011P2_VD, B101P2_IVD and B111P2_IVD cached in the page buffers PB<001, 011, 101, 111>, and transmits the selected page of valid data to the memory 144. At this time, the controller 130 does not transmit, to the memory 144, the three pages of invalid data B001P2_IVD, B101P2_IVD and B111P2_IVD. Rather, the controller 130 discards the three pages of invalid data.

In this way, the controller 130 may extract valid data B011P2_VD stored in the valid page BLOCK011_P<2> of the second super memory block SUPER BLOCK<1>, through the third read P<2>_READ.

As described above, in order to extract all of the valid data B001P0_VD, B011P2_VD and B111P1_VD stored in the three valid pages BLOCK001_P<0>, BLOCK011_P<2> and BLOCK111_P<1> of the second super memory block SUPER BLOCK<1>, the controller 130 may determine that three reads P<0>_READ, P<1>_READ and P<2>_READ are necessary.

Herein, a time needed to perform one read P<0>_READ, P<1>_READ or P<2>_READ may be denoted as a read time tREAD. Moreover, a time needed to transmit one page of data B001P0_VD, B011P2_VD or B111P1_VD stored in one page buffer PB<001>, PB<011> or PB<111> to the memory 144 may be denoted as a transmission time tTX. Thus, the second required time TOTAL<1> needed to extract data by selecting the second super memory block SUPER BLOCK<1> may be "{(tREAD*3)+(tTX*3)}", where tREAD is a read time and tTX is a transmission time. For example, when the read time tREAD is 50 us and the transmission time tTX is 10 us, the second required time TOTAL<1> will be 180 us.

In summary, since each of the first super memory block SUPER BLOCK<0> of FIG. 5A and the second super memory block SUPER BLOCK<1> of FIG. 5B includes three valid pages, they have the same condition in a scheme in which a victim block for garbage collection is selected based on the number of valid pages.

However, in the case where each of the super memory blocks SUPER BLOCK<0, 1> of FIGS. 5A and 5B is selected as a victim block for garbage collection, the first required time TOTAL<0> needed to extract data from the first super memory block SUPER BLOCK<0> of FIG. 5A is 80 us, whereas the second required time TOTAL<1> needed to extract data from the second super memory block SUPER BLOCK<1> of FIG. 5B is 180 us, that is more than two times the first required time TOTAL<0>.

Thus, in order to effectively perform garbage collection, the controller 130 may select the first super memory block SUPER BLOCK<0> among the super memory blocks SUPER BLOCK<0, 1>, as a victim block.

Figure 6:
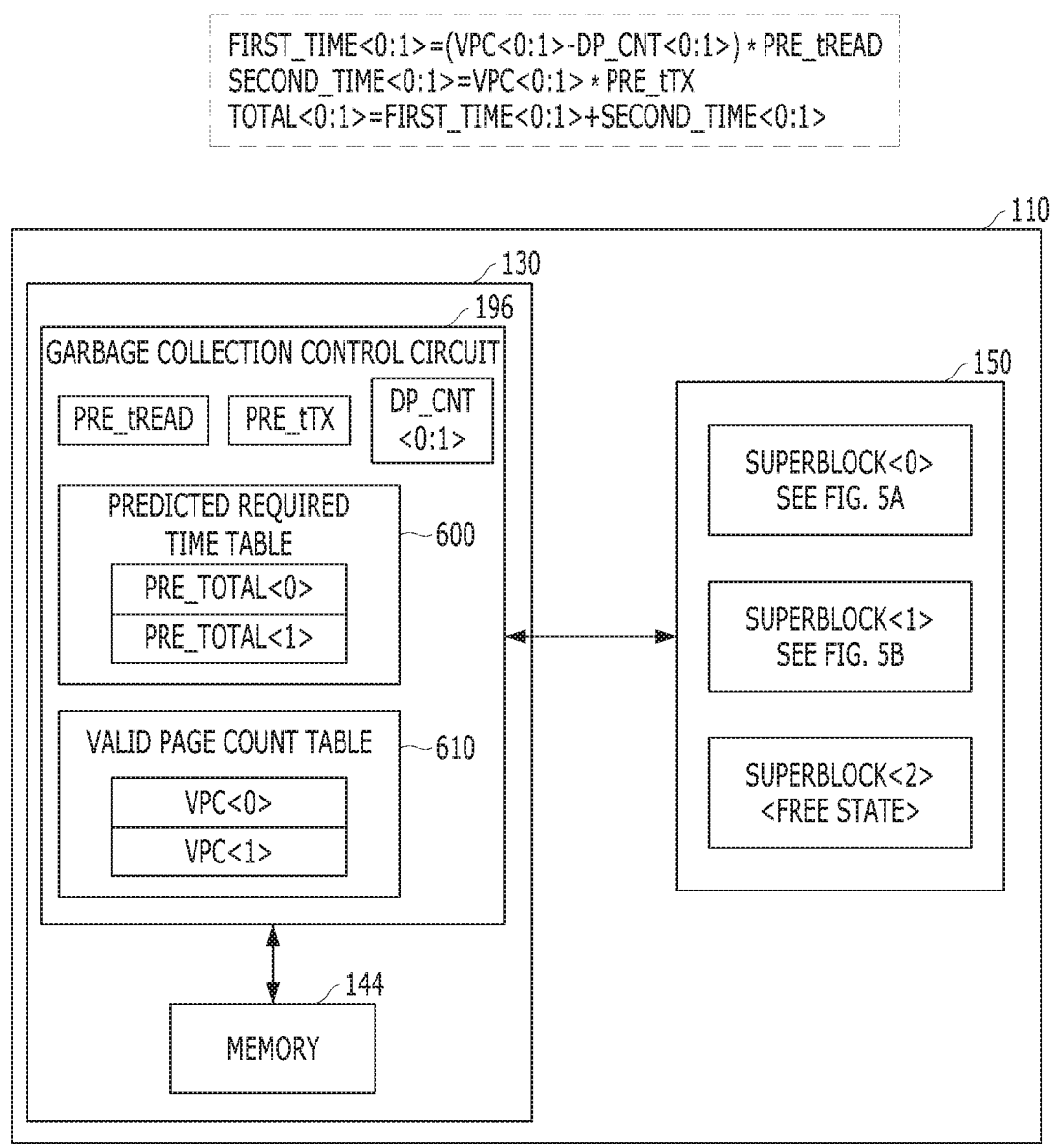
FIG. 6 is a diagram illustrating a memory system in accordance with an embodiment.

FIG. 6 is a diagram illustrating a memory system in accordance with an embodiment. The operation of FIG. 6 may correspond to any of the schemes of FIGS. 5A and 5B.

Referring to FIG. 6, the memory system 110 includes the controller 130 and the memory device 150.

The controller 130 may include the garbage collection control circuit 196 and the memory 144. Since operations of the garbage collection control circuit 196 are described above with reference to FIG. 3, further description thereof is omitted here.

The memory device 150 includes a plurality of memory blocks. The controller 130 groups N memory blocks capable of being read in parallel among the plurality of memory blocks of the memory device 150, according to a set condition, and thereby, manages a plurality of super memory blocks SUPER BLOCK<0:M>, where N and M are a natural number of 2 or greater, respectively, and it is assumed in FIGS. 5A and 5B that N is 4. The memory device 150 may include the two super memory blocks SUPER BLOCK<0, 1> of FIGS. 5A and 5B, and one super memory block SUPER BLOCK<2> which is in a free state. The above-described configuration is exemplary; in other embodiments, any suitable number of super memory blocks may be included in the memory device 150.

The controller 130 generates predicted required times PRE_TOTAL<0, 1> by predictively calculating, by the unit of super block, required times needed to extract valid data for garbage collection from the memory blocks of the memory device 150. Further, the controller 130 manages the generated predicted required times PRE_TOTAL<0, 1> in a predicted required time table 600, through the garbage collection control circuit 196.

Through the garbage collection control circuit 196, the controller 130 counts the number of valid page VPC<0:1> of the respective memory blocks of the memory device 150 by the unit of super block. Further, the controller 130 manages the counted valid pages VPC<0:1> in a valid page count table 610.

In various embodiments, the controller 130 calculates first times FIRST_TIME<0:1> through the equation of FIRST_TIME<0:1>=(VPC<0:1>−DP_CNT<0:1>)*PRE_tREAD. In other words, the controller 130 subtracts DP_CNT<0:1> from VPC<0:1>. DP_CNT<0:1> are counts of valid pages having the same positions, of the four memory blocks BLOCK<000, 010, 100, 110> of the super memory block SUPER BLOCK<0> and of the four memory blocks BLOCK<001, 011, 101, 111> of the super memory block SUPER BLOCK<1>. VPC<0:1> are counts of valid pages of the plurality of super memory blocks SUPER BLOCK<0, 1>, respectively. Then, the controller 130 multiplies the subtraction result by a predicted read time PRE_tREAD.

Also, the controller 130 calculates second times SECOND_TIME<0:1> through the equation of SECOND_TIME<0:1>=VPC<0:1>*PRE_tTX. In other words, the controller 130 multiplies VPC<0:1> by a predicted transmission time PRE_tTX. VPC<0:1> are counts of valid page of the plurality of super memory blocks SUPER BLOCK<0, 1>.

The controller 130 generates the predicted required times PRE_TOTAL<0, 1> of each of the plurality of super memory blocks SUPER BLOCK<0, 1>. In other words, the controller 130 calculates the sum of the first times FIRST_TIME<0:1> and the second times SECOND_TIME<0:1>, through the equation of TOTAL<0:1>FIRST_TIME<0:1>+SECOND_TIME<0:1>.

Referring to FIG. 5A and FIG. 6, in the first super memory block SUPER BLOCK<0>, only the first pages P<0> of the first to third memory blocks BLOCK<000, 010, 100> are valid pages and all the other pages are invalid pages.

Accordingly, the controller 130 may determine that the first valid page count VPC<0> of the valid pages in the first super memory block SUPER BLOCK<0> is 3.

Also, the controller 130 may determine that, since all the three valid pages in the first super memory block SUPER BLOCK<0> are first pages P<0>, the first count DP_CNT<0> of valid pages of which positions are the same is 2. Based on the first valid page BLOCK000/P<0>, the second and third valid pages BLOCK010/P<0> and BLOCK100/P<0> each have the same position as the first valid page BLOCK000/P<0>. Therefore, valid pages of which positions are the same in the first super memory block SUPER BLOCK<0> include the second and third valid pages BLOCK010/P<0> and BLOCK100/P<0>, and, therefore, the first count DP_CNT<0> is 2.

Hence, the first first time FIRST_TIME<0> corresponding to the first super memory block SUPER BLOCK<0> represents the predicted read time PRE_tREAD, which is derived through calculation of {(3−2)*PRE_tREAD}. The first second time SECOND_TIME<0> corresponding to the first super memory block SUPER BLOCK<0> is three times the predicted transmission time PRE_tTX, which is derived through calculation of {3*PRE_tTX}. As a result, the first predicted required time PRE_TOTAL<0> corresponding to the first super memory block SUPER BLOCK<0> is obtained by summing the first first time FIRST_TIME<0> and the first second time SECOND_TIME<0>.

For example, when the predicted read time PRE_tREAD is 50 us and the predicted transmission time PRE_tTX is 10 us, the first predicted required time PRE_TOTAL<0> corresponding to the first super memory block SUPER BLOCK<0> is 80 us. In other words, the first predicted required time PRE_TOTAL<0> is calculated by summing the first first time FIRST_TIME 0> of 50 us and the first second time SECOND_TIME<0> of 30 us.

Referring to FIG. 5B and FIG. 6, in the second super memory block SUPER BLOCK<1>, only the first page P<0> of the first memory block BLOCK001, the third page P<2> of the second memory block BLOCK011 and the second page P<1> of the fourth memory block BLOCK111 are valid pages and all the other pages are invalid pages.

Accordingly, the controller 130 may determine that the second valid page count VPC<1> of the valid pages in the second super memory block SUPER BLOCK<1> is 3.

Also, the controller 130 may determine that, since the positions of the three valid pages in the second super memory block SUPER BLOCK<1> are different from one another, the second count DP_CNT<1> of valid pages of which positions are the same is 0. Based on the first valid page P<0> of the block BLOCK001 BLOCK001/P<0>, the second valid page BLOCK011/P<2> and the third valid page BLOCK111/P<1> each have a position that is different from the first valid page BLOCK001/P<0>. Moreover, the positions of the second valid page BLOCK011/P<2> and the third valid page BLOCK111/P<1> are also different from each other. Therefore, there are no valid pages of which positions are the same in the second super memory block SUPER BLOCK<1>, and, therefore, the second count DP_CNT<1> of valid pages of which positions are the same is 0.

Hence, the second first time FIRST_TIME<1> corresponding to the second super memory block SUPER BLOCK<1> is three times the predicted read time PRE_tREAD, which is derived through calculation of {(3−0)*PRE_tREAD}. The second time SECOND_TIME<1> corresponding to the second super memory block SUPER BLOCK<1> is three times the predicted transmission time PRE_tTX, which is derived through calculation of {3 PRE_tTX}. As a result, the second predicted required time PRE_TOTAL<1> corresponding to the second super memory block SUPER BLOCK<1> is obtained by summing the second first time FIRST_TIME<1> corresponding to three times the predicted read time PRE_tREAD and the second time SECOND_TIME<1> is three times the predicted transmission time PRE_tTX.

For example, when the predicted read time PRE_tREAD is 50 us and the predicted transmission time PRE_tTX is 10 us, the second predicted required time PRE_TOTAL<1> corresponding to the second super memory block SUPER BLOCK<1> is 180 us. In other words, the second predicted required time PRE_TOTAL<1> is calculated by summing the second first time FIRST_TIME<1> of 150 us and the second second time SECOND_TIME<1> of 30 us.

In various embodiments, the controller 130 may be set with information on the predicted read time PRE_tREAD and the predicted transmission time PRE_tTX for the memory device 150. That is to say, a designer may set in advance the predicted read time PRE_tREAD and the predicted transmission time PRE_tTX for the memory device 150, through a test, depending on the type or configuration of the memory device 150.

As described above, the controller 130 may predictively calculate the respective predicted required times PRE_TOTAL<0, 1> for each of the plurality of super memory blocks SUPER BLOCK<0, 1>, before performing garbage collection.

The controller 130 may determine and select a memory block as a victim block for garbage collection, among the plurality of memory blocks of the memory device 150, based on the predicted required times PRE_TOTAL<0, 1> for the plurality of super memory blocks SUPER BLOCK<0, 1>, through the garbage collection control circuit 196. The predicted required times PRE_TOTAL<0, 1> are included in the predicted required time table 600.

A method by which the controller 130 refers to and uses the predicted required times PRE_TOTAL<0, 1> may be carried according to either of the following two schemes; the controller 130 may select the scheme(s) to use.

In accordance with a first scheme, the controller 130 selects, as a victim block, a memory block including at least one valid page among N memory blocks grouped into a super memory block, which selected memory block has the lowest of the predicted required times PRE_TOTAL<0, 1> for the plurality of super memory blocks SUPER BLOCK<0, 1>.

For example, when the predicted required time PRE_TOTAL<0> for the first super memory block SUPER BLOCK<0> is 80 us and the predicted required time PRE_TOTAL<1> for the second super memory block SUPER BLOCK<1> is 180 us, the predicted required time PRE_TOTAL<0> for the first super memory block SUPER BLOCK<0> is shorter. Therefore, the controller 130 selects, as victim blocks, the three memory blocks BLOCK<000, 010, 100> each including at least one valid page among the four memory blocks BLOCK<000, 010, 100, 110> grouped into the first super memory block SUPER BLOCK<0>.

In this way, because the three memory blocks BLOCK<000, 010, 100> of the first super memory block SUPER BLOCK<0> are selected as victim blocks, during a period in which garbage collection is performed, data of the three valid pages of the first super memory block SUPER BLOCK<0> are transferred to the memory 144, and then, are stored in the third super memory block SUPER BLOCK<2> as a target block.

In accordance with a second scheme, which is used before using the above-described first scheme, the controller 130 checks the number of super memory blocks of which valid page counts VPC<0:1> are compared with a set count, e.g., 2. The valid page counts VPC<0:1> are obtained by summing the counts of valid pages of the memory blocks in the respective super memory blocks SUPER BLOCK<0, 1>. In other words, when only one of the super memory blocks has a number of valid page counts VPC<0:1> less than or equal to the set count, the controller 130 does not use the above-described first scheme. Conversely, when there are more than one, e.g., at least two, super memory blocks, each of which has a valid page count less than or equal to the set count, the controller 130 uses the above-described first scheme.

In another example, unlike that given above, the valid page count VPC<0> of the first super memory block SUPER BLOCK<0> may be 5, and the valid page count VPC<1> of the second super memory block SUPER BLOCK<1> may be 1, and the controller 130 may set the set count to 2. In this case, the controller 130 may determine that one super memory block (that is, the second super memory block SUPER BLOCK<1>) has a valid page count VPC<1> which is less than or equal to the set count. Thus, the controller 130 does not use the above-described first scheme. Instead, the controller 130 selects a memory block including at least one valid page among the N memory blocks in the second super memory block SUPER BLOCK<1> which has the valid page count VPC<1> less than or equal to the set count, as a victim block.

In another example, the valid page count VPC<0> of the first super memory block SUPER BLOCK<0> may be 3, the valid page count VPC<1> of the second super memory block SUPER BLOCK<1> may be 3, and the controller 130 may set the set count to 2. In this case, the controller 130 may determine that both of the two super memory blocks, (that is, the first super memory block SUPER BLOCK<0> and the second super memory block SUPER BLOCK<1>) have valid page counts which are less than or equal to the set count. Thus, the controller 130 uses the above-described first scheme. In other words, the controller 130 selects memory blocks, each including at least one valid page among the N memory blocks in the first super memory block SUPER BLOCK<0>, which has the shorter predicted required time PRE_TOTAL<0>, as victim blocks.

As described above, the controller 130 generates the predicted required times PRE_TOTAL<0, 1>, and manages the generated predicted required times PRE_TOTAL<0, 1> in the predicted required time table 600.

In this regard, the controller 130 may update the predicted required times PRE_TOTAL<0, 1> by using any one of the following two schemes.

In accordance with a first scheme, whenever a valid page count for a certain memory block changes, the controller 130 may update the predicted required time of a super memory block that includes the certain memory block.

Referring to FIGS. 4 and 5A, for example, the valid page count of the first memory block BLOCK000 of the first plane PLANE00 of the first memory die DIE0 may change according to a first foreground operation or background operation. Then, the valid page count of the second memory block BLOCK001 of the first plane PLANE00 of the first memory die DIE0 may change according to performing of a second foreground operation or background operation.

In this case, in response to the change of the valid page count of the first memory block BLOCK000, the controller 130 may predictively calculate again the value of the first predicted required time PRE_TOTAL<0> corresponding to the first super memory block SUPER BLOCK<0> that includes the memory block BLOCK000. Then, in response to the change of the valid page count of the second memory block BLOCK001, the controller 130 may predictively calculate again the value of the second predicted required time PRE_TOTAL<1> corresponding to the second super memory block SUPER BLOCK<1> that includes memory block BLOCK001.

In accordance with a second scheme, the controller 130 may check, at each set time, whether a certain memory block of which valid page count has changed exists among the plurality of memory blocks. As a result of checking, in the case where a certain memory block of which valid page count has changed exists, the controller 130 may update the predicted required time of a super memory block that includes the certain memory block.

Referring to FIGS. 4 and 5A, for example, as at least two successive foreground operations or background operations are performed between a first set time and a second set time, the valid page counts of the first memory block BLOCK000 and the second memory block BLOCK001 of the first plane PLANE00 of the first memory die DIE0 may change.

In this case, the controller 130 may check, at the second set time, whether a memory block of which valid page count has changed exists among the plurality of memory blocks. As a result of checking, the controller 130 may determine that the valid page counts of the first memory block BLOCK000 and the second memory block BLOCK001 of the first plane PLANE00 of the first memory die DIE0 have changed. Therefore, the controller 130 may predictively calculate again simultaneously, at the second set time, the value of the first predicted required time PRE_TOTAL<0> corresponding to the first super memory block SUPER BLOCK<0> that includes the first memory block BLOCK000, and the value of the second predicted required time PRE_TOTAL<1> corresponding to the second super memory block SUPER BLOCK<1> that includes the second memory block BLOCK001.

In various embodiments, the set time may be defined in advance by a designer. Such time may occur each time data of a certain size is written or each time a specific operation is completed.

As garbage collection is performed, if all valid pages of the first super memory block SUPER BLOCK<0> as a victim block are transferred to the memory 144 and are then moved to the third super memory block SUPER BLOCK<2> as a target block, the first super memory block SUPER BLOCK<0> assumes a state in which it has no valid pages. Therefore, after garbage collection, the first super memory block SUPER BLOCK<0> as an invalid super memory block, need not be involved in any operation except an operation in which it becomes a free super memory block through an erase operation. In this regard, because the controller 130 has generated the first predicted required time PRE_TOTAL<0> for the first super memory block SUPER BLOCK<0> before performing garbage collection, the value thereof may be left in the predicted required time table 600 even after garbage collection is performed. Due to the value of the first predicted required time PRE_TOTAL<0> left in the predicted required time table 600 in this way, an unknown abnormal operation may be performed for the first super memory block SUPER BLOCK<0>. Therefore, after garbage collection for the first super memory block SUPER BLOCK<0> is performed, the controller 130 sets the first predicted required time PRE_TOTAL<0> corresponding to the first super memory block SUPER BLOCK<0> to a specific value, and thereby, prevents an unknown abnormal operation from being performed for the first super memory block SUPER BLOCK<0>. Here, the specific value may be set to a settable maximum value.

Summarizing this, in the case where a certain super memory block is selected as a victim block and all valid pages therein are moved to a target super memory block, the controller 130 may set a predicted required time for the selected super memory block to a specific value such that the selected super memory block cannot perform an unknown abnormal operation.

If the number of free memory blocks among the plurality of memory blocks in the memory device 150 is sufficiently large, the probability of performing garbage collection is not high. Namely, in general, garbage collection is an operation to be performed when the number of free blocks in the memory device 150 decreases to at or below a threshold number.

Thus, the controller 130 generates and manages the above-described predicted required times PRE_TOTAL<0, 1> during a period in which the number of free memory blocks among the plurality of memory blocks in the memory device 150 is less than or equal to a first number. Further, the controller 130 does not generate and manage the predicted required times PRE_TOTAL<0, 1> during a period in which the number of free memory blocks among the plurality of memory blocks in the memory device 150 is greater than or equal to a second number, which is greater than the first number.

In various embodiments, the first number may be set differently from the number for determining a trigger time of a general garbage collection operation. For example, the trigger time number may be less than the first number.

Second Embodiment

Figure 7B:
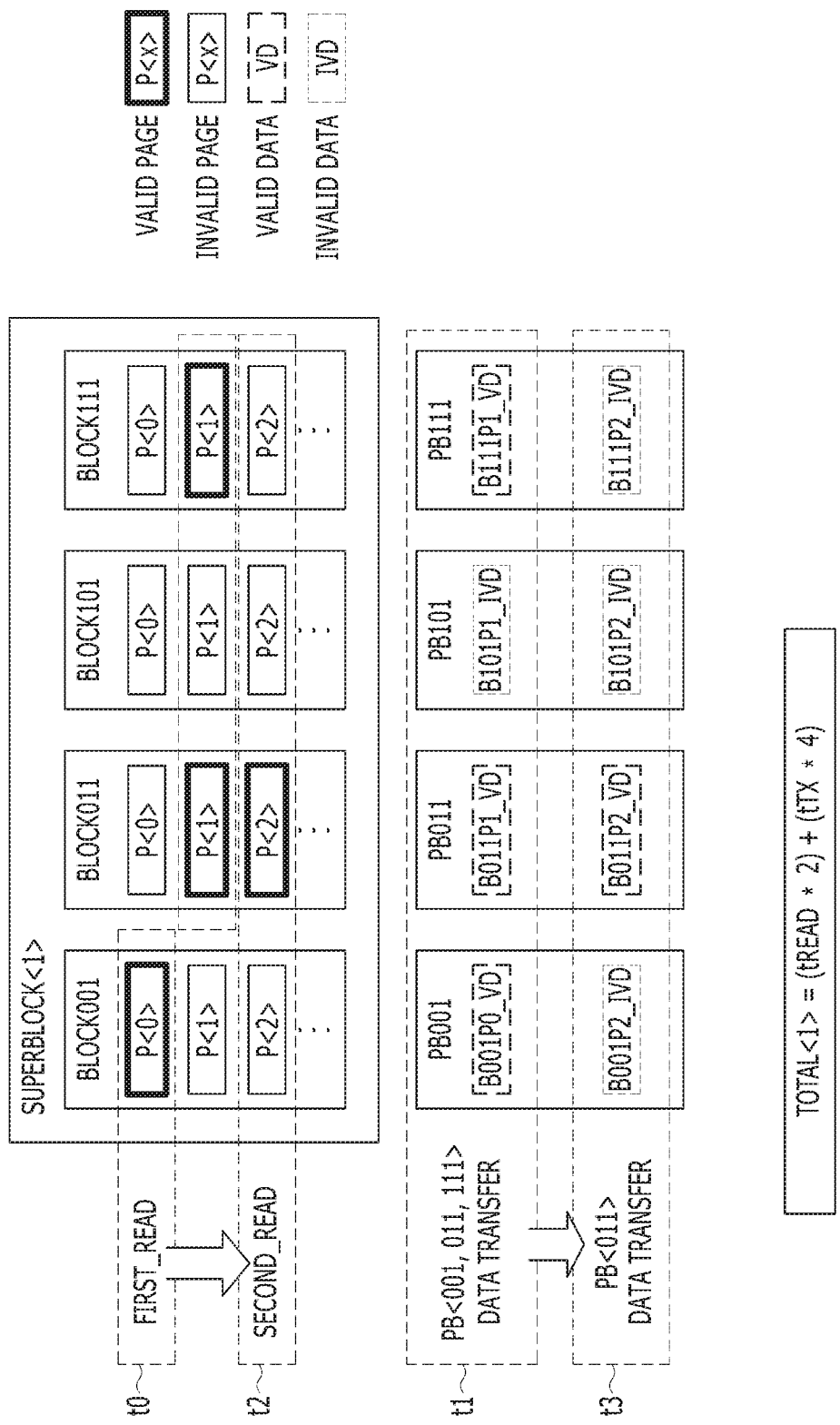

FIGS. 7A and 7B are diagrams illustrating garbage collection for a super memory block in a memory system in accordance with another embodiment.

It may be seen that the embodiment of FIGS. 7A and 7B uses the third scheme among the schemes of dividing memory blocks into super memory blocks by the controller 130, described above with reference to FIG. 4.

Referring to FIGS. 7A and 7B, the controller 130 manages each of super memory blocks SUPER BLOCK<0> and SUPER BLOCK<1> by selecting one memory block in each of four planes PLANE<00, 01, 10, 11> of the memory device 150. Therefore, four memory blocks are included in each of the super memory blocks SUPER BLOCK<0> and SUPER BLOCK<1>.

For example, referring to FIGS. 4 and 7A, the first super memory block SUPER BLOCK<0> is defined (or generated) by grouping the first memory block BLOCK000, the first memory block BLOCK010, the first memory block BLOCK100 and the first memory block BLOCK110. The first memory block BLOCK000 is included in the first plane PLANE00 of the first memory die DIE0. The first memory block BLOCK010 is included in the second plane PLANE01 of the first memory die DIE0. The first memory block BLOCK100 is included in the first plane PLANE10 of the second memory die DIE1. The first memory block BLOCK110 is included in the second plane PLANE11 of the second memory die DIE1.

Referring to FIGS. 4 and 7B, the second super memory block SUPER BLOCK<1> is defined (or generated) by grouping the second memory block BLOCK001, the second memory block BLOCK011, the second memory block BLOCK101 and the second memory block BLOCK111. The second memory block BLOCK001 is included in the first plane PLANE00 of the first memory die DIE0. The second memory block BLOCK011 is included in the second plane PLANE01 of the first memory die DIE0. The second memory block BLOCK101 is included in the first plane PLANE10 of the second memory die DIE1. The second memory block BLOCK111 is included in the second plane PLANE11 of the second memory die DIE1.

As shown in FIGS. 7A and 7B, each of the super memory blocks SUPER BLOCK<0, 1> may input and output data of page unit by selecting in parallel the four memory blocks BLOCK<000, 010, 100, 110> or BLOCK<001, 011, 101, 111> included therein.

In this regard, each of the super memory blocks SUPER BLOCK<0, 1> is able to read in parallel pages at different positions when selecting in parallel the four memory blocks BLOCK<000, 010, 100, 110> or BLOCK<001, 011, 101, 111> included therein. Even though parallel read is possible for pages at different positions, only one page in one block may be selected and read at a time.

In FIG. 7A, that the first super memory block SUPER BLOCK<0> selects in parallel the four memory blocks BLOCK<000, 010, 100, 110> means that pages are simultaneously selected in the four memory blocks BLOCK<000, 010, 100, 110>, respectively, regardless of position. That is to say, the first super memory block SUPER BLOCK<0> selects a first page P<0> in the first memory block BLOCK000, selects a third page P<2> in the second memory block BLOCK010, and selects a second page P<1> in each of the third and fourth memory blocks BLOCK<100, 110>. Of course, a read in such a pattern of selecting two pages in each of the first and second memory blocks BLOCK<000, 010> and selecting no page in the third and fourth memory blocks BLOCK<100, 110> is impossible.

In FIG. 7B, that the second super memory block SUPER BLOCK<1> selects in parallel the four memory blocks BLOCK<001, 011, 101, 111> means that pages are simultaneously selected in the four memory blocks BLOCK<001, 011, 101, 111>, respectively, regardless of position. That is to say, the second super memory block SUPER BLOCK<1> selects a first page P<0> in the first memory block BLOCK001, and selects a second page P<1> in each of the second to fourth memory blocks BLOCK<011, 101, 111>. Of course, a read in such a pattern of selecting two pages in each of the second and third memory blocks BLOCK<011, 101> and selecting no page in the first and fourth memory blocks BLOCK<001, 111> is impossible.

In FIGS. 7A and 7B, each of the plurality of pages in each of the four memory blocks BLOCK<000, 010, 100, 110> and the fourth memory blocks BLOCK<001, 011, 101, 111> may be a valid page or an invalid page, which is independent of the validity or invalidity or any of the other pages.

For example, in the first super memory block SUPER BLOCK<0> of FIG. 7A, only the first page P<0> of the first memory block BLOCK000, the third page P<2> of the second memory block BLOCK010 and the second pages P<1> of the third and fourth memory blocks BLOCK<100, 110> may be valid pages (as shown by bolded boxes) and all the other pages may be invalid pages (as shown by non-bolded boxes).

In the second super memory block SUPER BLOCK<1> of FIG. 7B, only the first page P<0> of the first memory block BLOCK001, the second and third pages P<1, 2> of the second memory block BLOCK011 and the second page P<1> of the fourth memory block BLOCK111 may be valid pages and all the other pages may be invalid pages.

Each of the first super memory block SUPER BLOCK<0> of FIG. 7A and the second super memory block SUPER BLOCK<1> of FIG. 7B includes four valid pages.

In FIGS. 7A and 7B, the four memory blocks BLOCK<000, 010, 100, 110> and the four memory blocks BLOCK<001, 011, 101, 111> of the super memory blocks SUPER BLOCK<0, 1> may be respectively selected as victim blocks for garbage collection.

When the first super memory block SUPER BLOCK<0> of FIG. 7A is selected as a victim block for garbage collection, a time needed to extract data from the four valid pages of the four memory blocks BLOCK<000, 010, 100, 110> may be defined as a first required time TOTAL<0>. When the second super memory block SUPER BLOCK<1> of FIG. 7B is selected as a victim block for garbage collection, a time needed to extract data from the four valid pages of the four memory blocks BLOCK<001, 011, 101, 111> may be defined as a second required time TOTAL<1>.

The first required time TOTAL<0> of FIG. 7A and the second required time TOTAL<1> of FIG. 7B may be substantially different for the reasons set forth below.

In order to extract data from the four valid pages of the four memory blocks BLOCK<000, 010, 100, 110>, by selecting the first super memory block SUPER BLOCK<0> of FIG. 7A as a victim block, the positions of the four valid pages may be determined.

As a result of the determination, in the first super memory block SUPER BLOCK<0> of FIG. 7A, only the first page P<0> of the first memory block BLOCK000, the third page P<2> of the second memory block BLOCK010 and the second page P<1> of each of the third and fourth memory blocks BLOCK<100, 110> are valid pages and all the other pages are invalid pages.

According to the determination result, the four valid pages of the first super memory block SUPER BLOCK<0> include valid pages which are different in their positions and valid pages which are the same in their positions. Further, each of the four memory blocks BLOCK<000, 010, 100, 110> of the first super memory block SUPER BLOCK<0> includes one valid page. That is to say, a largest count among valid page counts of the four memory blocks BLOCK<000, 010, 100, 110> of the first super memory block SUPER BLOCK<0> is 1. This means that, in order to extract valid data from the four valid pages included in the first super memory block SUPER BLOCK<0>, it is necessary to perform one read FIRST_READ.

Therefore, the controller 130 performs the one read FIRST_READ for the first page P<0> of the first memory block BLOCK000, the third page P<2> of the second memory block BLOCK010 and the second page P<1> of each of the third and fourth memory blocks BLOCK<100, 110>, at a zeroth time t0. Through the one read FIRST_READ, four pages of data B000P0_VD, B010P2_VD, B100P1_VD and B110P1_VD are cached in four page buffers PB<000, 010, 100, 110>, respectively. At a first time t1, the controller 130 transmits all the four pages of data B000P0_VD, B010P2_VD, B100P1_VD and B110P1_VD to the memory 144 since those pages contain valid data.

In this way, the controller 130 may extract all the valid data (VALID DATA) B000P0_VD, B010P2_VD, B100P1_VD and B110P1_VD stored in the four valid pages BLOCK000_P<0>, BLOCK010_P<2>, BLOCK100_P<1> and BLOCK110_P<1> in the first super memory block SUPER BLOCK<0>, through the one read FIRST_READ.

Herein, a time needed to perform the one read FIRST_READ may be denoted as a read time tREAD. Moreover, a time needed to transmit one page of data B000P0_VD, B010P2_VD, B100P1_VD or B110P1_VD stored in one page buffer PB<000>, PB<010>, PB<100> or PB<110> to the memory 144 may be denoted as a transmission time tTX. Thus, the first required time TOTAL<0> needed to extract data by selecting the first super memory block SUPER BLOCK<0> may be "{r(tREAD*1)+(tTX*4)}", where tREAD is a read time and tTX is a transmission time. For example, when the read time tREAD is 50 us and the transmission time tTX is 10 us, the first required time TOTAL<0> will be 90 us.

In order to extract data from the four valid pages of the four memory blocks BLOCK<001, 011, 101, 111>, by selecting the second super memory block SUPER BLOCK<1> of FIG. 7B as a victim block, the positions of the four valid pages may be checked.

As a result of checking of FIG. 7B, in the second super memory block SUPER BLOCK<1>, only the first page P<0> of the first memory block BLOCK001, the second and third pages P<1, 2> of the second memory block BLOCK011 and the second page P<1> of the fourth memory block BLOCK111 are valid pages and all the other pages are invalid pages.

According to the checking result, the four valid pages of the second super memory block SUPER BLOCK<1> include valid pages having different positions and valid pages having the same positions. Also, among the four memory blocks BLOCK<001, 011, 101, 111> of the second super memory block SUPER BLOCK<1>, each of the first and fourth memory blocks BLOCK<001, 111> includes one valid page, the second memory block BLOCK011 includes two valid pages, and the third memory block BLOCK101 includes no valid page. That is to say, a largest count among valid page counts of the four memory blocks BLOCK<001, 011, 101, 111> of the second super memory block SUPER BLOCK<1> is 2. This means that, in order to extract four valid data from the four valid pages included in the second super memory block SUPER BLOCK<1>, it is necessary to perform two reads FIRST_READ and SECOND_READ.

Therefore, the controller 130 performs the first read FIRST_READ for the first page P<0> of the first memory block BLOCK001 in the second super memory block SUPER BLOCK<1> and the second page P<1> of each of the second to fourth memory blocks BLOCK<011, 101, 111>, at a zeroth time t0. Through the first read FIRST_READ, four pages of valid data B001P0_VD, B011P1_VD, B101P1_IVD and B111P1_VD are cached in four page buffers PB<001, 011, 101, 111>. At a first time t1, the controller 130 selects only three valid data B001P0_VD, B011P1_VD and B111P1_VD among the four pages of data B001P0_VD, B011P1_VD, B101P1_IVD and B111P1_VD cached in the page buffers PB<001, 011, 101, 111>, and transmits the selected valid data to the memory 144 (DATA TRANSFER). At this time, the controller 130 does not transmit, to the memory 144, the invalid data B101P1_IVD among the four page data B001P0_VD, B011P1_VD, B101P1_IVD, B111P1_VD cached in the page buffers PB<001, 011, 101, 111>. Instead, the controller 130 discards the invalid data.

In this way, the controller 130 may extract the valid data B001P0_VD, B011P1_VD and B111P1_VD stored in the three valid pages BLOCK001_P<0>, BLOCK011_P<1> and BLOCK111_P<1> of the second super memory block SUPER BLOCK<1>, through the first read FIRST_READ.

Next, the controller 130 performs the second read SECOND_READ for the third pages P<2> of the four memory blocks BLOCK<001, 011, 101, 111>, at a second time t2. Through the second read SECOND_READ, four pages of data B001P2_IVD, B011P2_VD, B101P2_IVD and B111P2_IVD are cached in the four page buffers PB<001, 011, 101, 111>. At a third time t3, the controller 130 selects only valid data B011P2_VD among the four page data B001P2_IVD, B011P2_VD, B101P2_IVD and B111P2_IVD cached in the page buffers PB<001, 011, 101, 111>, and transmits the selected valid data to the memory 144. At this time, the controller 130 does not transmit, to the memory 144, invalid data B001P2_IVD, B101P2_IVD and B111P2_IVD among the four pages of data B001P2_IVD, B011P2_VD, B101P2_IVD and B111P2_IVD cached in the page buffers PB<001, 011, 101, 111>, and instead discards the invalid data.

In this way, the controller 130 may extract one valid data (VALID DATA) B011P2_VD stored in one valid page BLOCK011_P<2> of the second super memory block SUPER BLOCK<1>, through the second read SECOND_READ.

As described above, in order to extract all valid data B001P0_VD, B011P1_VD, B011P2_VD and B111P1_VD stored in the four valid pages BLOCK001_P<0>, BLOCK011_P<1>, BLOCK011 P<2> and BLOCK111_P<1> of the second super memory block SUPER BLOCK<1>, the controller 130 may determine that the two reads FIRST_READ and SECOND_READ are necessary.

Herein, a time needed to perform one read FIRST_READ or SECOND_READ may be denoted as a read time tREAD. Moreover, a time needed to transmit one page of data B001P0_VD, B011P1_VD, B011P2_VD or B111P1_VD stored in one page buffer PB<001>, PB<011>, PB<101> or PB<111> to the memory 144 may be denoted as a transmission time tX. Thus, the second required time TOTAL<1> needed to extract data by selecting the second super memory block SUPER BLOCK<1> may be "{(tREAD*2)+(tTX*4)}", where tREAD is a read time and tTX is a transmission time. For example, when the read time tREAD is 50 us and the transmission time tTX is 10 us, the second required time TOTAL<1> will be 140 us.

In summary, since each of the first super memory block SUPER BLOCK<0> of FIG. 7A and the second super memory block SUPER BLOCK<1> of FIG. 7B includes four valid pages, they have the same condition in the case of a scheme in which a victim block for garbage collection is selected based on the number of valid pages.

However, in the case where each of the super memory blocks SUPER BLOCK<0, 1> of FIGS. 7A and 7B is selected as a victim block for garbage collection, the first required time TOTAL<0> needed to extract data from the first super memory block SUPER BLOCK<0> of FIG. 7A is 90 us, whereas the second required time TOTAL<1> needed to extract data from the second super memory block SUPER BLOCK<1> of FIG. 7B is 140 us, which is significantly different from the first required time TOTAL<0>.

Thus, in order to effectively perform garbage collection, the controller 130 may select the first super memory block SUPER BLOCK<0> among the super memory blocks SUPER BLOCK<0, 1> of FIGS. 7A and 7B, as a victim block.

Figure 8:
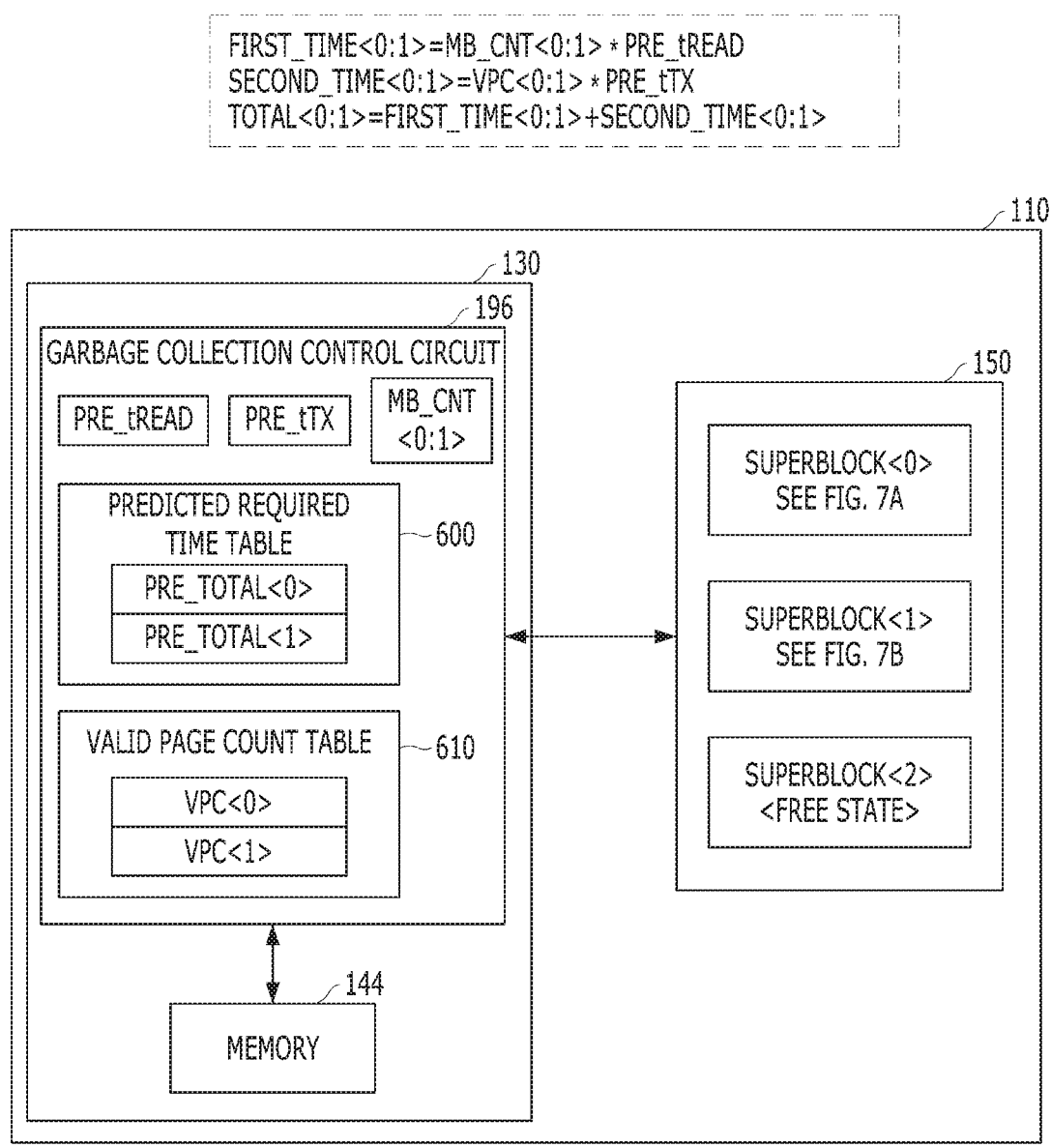
FIG. 8 is a diagram illustrating a memory system in accordance with an embodiment.

FIG. 8 is a diagram illustrating a memory system in accordance with an embodiment. The operation of FIG. 8 may correspond to schemes of FIGS. 7A and 7B.

Referring to FIG. 8, the memory system 110 includes the controller 130 and the memory device 150.

The controller 130 may include the garbage collection control circuit 196 and the memory 144. Since generation operations of the garbage collection control circuit 196 were described above with reference to FIG. 3, detailed descriptions thereof will be omitted herein.

The memory device 150 includes a plurality of memory blocks. The controller 130 groups N memory blocks capable of being read in parallel among the plurality of memory blocks of the memory device 150, according to a set condition, and thereby, manages a plurality of super memory blocks SUPER BLOCK<0:M>, where N is a natural number of 2 or greater, and it is assumed in FIGS. 7A and 7B that N is 4. The memory device 150 may include the two super memory blocks SUPER BLOCK<0, 1> of FIGS. 7A and 7B, and one super memory block SUPER BLOCK<2> which is in a free state. Of course, a different number of super memory blocks, e.g., more than two, may be included in the memory device 150.

The controller 130 generates predicted required times PRE_TOTAL<0, 1> by predictively calculating, by the unit of super block, required times needed when extracting valid data for garbage collection from the memory blocks of the memory device 150. Further, the controller 130 manages the generated predicted required times PRE_TOTAL<0, 1>, as a predicted required time table 600, through the garbage collection control circuit 196.

Through the garbage collection control circuit 196, the controller 130 counts valid pages VPC<0:1> of the respective memory blocks of the memory device 150 by the unit of super block. Further, the controller 130 manages the valid page counts VPC<0:1> which are counted in this way, in a valid page count table 610.

In various embodiments, the controller 130 calculates first times FIRST_TIME<0:1> through the equation of FIRST_TIME<0:1>=MB_CNT<0:1>*PRE_tREAD. In other words, the controller 130 multiplies MB_CNT<0:1> by a predicted read time PRE_tREAD. MB_CNT<0:1> are largest count values among valid page counts of the respective four memory blocks BLOCK<000, 010, 100, 110> and the four respective memory blocks BLOCK<001, 011, 101, 111> of the plurality of super memory blocks SUPER BLOCK<0, 1>.

Also, the controller 130 calculates second times SECOND_TIME<0:1> through the equation of SECOND_TIME<0:1>=VPC<0:1>=PRE_tTX. In other words, the controller 130 multiplies VPC<0:1> by a predicted transmission time PRE_tTX. VPC<0:1> are valid page counts of the plurality of super memory blocks SUPER BLOCK<0, 1>.

The controller 130 generates the predicted required times PRE_TOTAL<0, 1> of each of the plurality of super memory blocks SUPER BLOCK<0, 1>. In other words, the controller 130 calculates the sum of the first times FIRST_TIME<0:1> and the second times SECOND_TIME<0:1>, through the equation of TOTAL<0:1>FIRST_TIME<0:1>+SECOND_TIME<0:1>.

Referring to FIG. 7A and FIG. 8, in the first super memory block SUPER BLOCK<0>, only the first page P<0> of the first memory block BLOCK000, the third page P<2> of the second memory block BLOCK010 and the second page P<1> of each of the third and fourth memory blocks BLOCK<100, 110> are valid pages and all the other pages are invalid pages.

Accordingly, the controller 130 may determine that the first valid page count VPC<0> of the valid pages in the first super memory block SUPER BLOCK<0> is 4.

Further, the controller 130 may determine that each of the four memory blocks BLOCK<000, 010, 100, 110> of the first super memory block SUPER BLOCK<0> includes one valid page. That is to say, the largest count MB_CNT<0> among the valid page counts of the four memory blocks BLOCK<000, 010, 100, 110> of the first super memory block SUPER BLOCK<0> is 1.

Hence, the first first time FIRST_TIME<0> corresponding to the first super memory block SUPER BLOCK<0> is the predicted read time PRE_tREAD, which is derived through calculation of (1*PRE_tREAD). The first second time SECOND_TIME<0> corresponding to the first super memory block SUPER BLOCK<0> is four times the predicted transmission time PRE_tTX, which is derived through calculation of (4*PRE_tTX). As a result, the first predicted required time PRE_TOTAL<0> corresponding to the first super memory block SUPER BLOCK<0> is obtained by summing the first first time FIRST_TIME<0> and the first second time SECOND_TIME<0>.

For example, when the predicted read time PRE_tREAD is 50 us and the predicted transmission time PRE_tTX is 10 us, the first predicted required time PRE_TOTAL<0> corresponding to the first super memory block SUPER BLOCK<0> is 90 us. In other words, the first predicted required time PRE_TOTAL<0> is calculated by summing the first first time FIRST_TIME<0> of 50 us and the first second time SECOND_TIME<0> of 40 us.

Referring to FIG. 7B and FIG. 8, in the second super memory block SUPER BLOCK<1>, only the first page P<0> of the first memory block BLOCK001, the second and third pages P<1, 2> of the second memory block BLOCK011 and the second page P<1> of the fourth memory block BLOCK111 are valid pages and all the other pages are invalid pages.

Accordingly, the controller 130 may determine that the second valid page count VPC<1> of the valid pages in the second super memory block SUPER BLOCK<1> is 4.

Also, the controller 130 may determine that, among the four memory blocks BLOCK<001, 011, 101, 111> of the second super memory block SUPER BLOCK<1>, each of the first and fourth memory blocks BLOCK<001, 111> includes one valid page, the second memory block BLOCK011 includes two valid pages, and the third memory block BLOCK101 includes no valid page. That is to say, the largest count MB_CNT<1> among the valid page counts of the four memory blocks BLOCK<001, 011, 101, 111> of the second super memory block SUPER BLOCK<1> is 2.

Hence, the second first time FIRST_TIME<1> corresponding to the second super memory block SUPER BLOCK<1> is two times the predicted read time PRE_tREAD, which is derived through calculation of {2 PRE_tREAD}. The second time SECOND_TIME<1> corresponding to the second super memory block SUPER BLOCK<1> is four times the predicted transmission time PRE_tTX, which is derived through calculation of {4 PRE_tTX}. As a result, the second predicted required time PRE_TOTAL<1> corresponding to the second super memory block SUPER BLOCK<1> is obtained by summing the second first time FIRST_TIME<1> which is two times the predicted read time PRE_tREAD and the second time SECOND_TIME<1> which is four times the predicted transmission time PRE_tTX.

For example, when the predicted read time PRE_tREAD is 50 us and the predicted transmission time PRE_tTX is 10 us, the second predicted required time PRE_TOTAL<1> corresponding to the second super memory block SUPER BLOCK<1> is 140 us. In other words, the second predicted required time PRE_TOTAL<1> is calculated by summing the second first time FIRST_TIME<1> of 100 us and the second second time SECOND_TIME<1> of 40 us.

In various embodiments, the controller 130 may be set with information on the predicted read time PRE_tREAD and the predicted transmission time PRE_tTX for the memory device 150. That is to say, a designer may set in advance the predicted read time PRE_tREAD and the predicted transmission time PRE_tTX for the memory device 150, through a test, depending on the type or configuration of the memory device 150.

As described above, the controller 130 may predictively calculate the respective predicted required times PRE_TO- TAL<0, 1> for each of the plurality of super memory blocks SUPER BLOCK<0, 1>, before performing garbage collection.

The controller 130 may determine and select a memory block as a victim block for garbage collection, among the plurality of memory blocks of the memory device 150, based on the predicted required times PRE_TOTAL<0, 1> for the plurality of super memory blocks SUPER BLOCK<0, 1>, through the garbage collection control circuit 196. The predicted required times PRE_TOTAL<0, 1> are included in the predicted required time table 600.

A method in which the controller 130 refers to the predicted required times PRE_TOTAL<0, 1> may include the following two schemes, and the controller 130 may select any one scheme.

In accordance with a first scheme, the controller 130 selects, as a victim block, a memory block including at least one valid page among N memory blocks grouped into a super memory block for which the predicted required time is the lowest among the predicted required times PRE_TOTAL<0, 1> for the plurality of super memory blocks SUPER BLOCK<0, 1.

For example, when the predicted required time PRE_TOTAL<0> for the first super memory block SUPER BLOCK<0>90 us and the predicted required time PRE_TOTAL<1> for the second super memory block SUPER BLOCK<1> is 140 us, the controller 130 selects, as victim blocks, the four memory blocks BLOCK<000, 010, 100, 110> each including at least one valid page among the four memory blocks BLOCK<000, 010, 100, 110> grouped into the first super memory block SUPER BLOCK<0>, since PRE_TOTAL<0> is the shorter of the two predicted required times.

In this way, because the four memory blocks BLOCK<000, 010, 100, 110> of the first super memory block SUPER BLOCK<0> are selected as victim blocks, during a period in which garbage collection is performed, data of the four valid pages of the first super memory block SUPER BLOCK<0> are transferred to the memory 144, and then, are stored in the third super memory block SUPER BLOCK<2> as a target block.

In accordance with a second scheme, used before using the above-described first scheme, the controller 130 checks the number of super memory blocks of which valid page counts VPC<0:1> are less than or equal to a set count, among the plurality of super memory blocks SUPER BLOCK<0, 1>. Each of the valid page counts VPC<0:1> is obtained by summing the counts of valid pages of the N number of memory blocks in each of the plurality of respective super memory blocks SUPER BLOCK<0, 1>. In other words, in the case when only one of the super memory blocks has a number of valid pages less than or equal to the set count, the controller 130 does not use the above-described first scheme. Conversely, when there are at least two such super memory blocks, the controller 130 uses the above-described first scheme.

As another example, the valid page count VPC<0> of the first super memory block SUPER BLOCK<0> may be 5, the valid page count VPC<1> of the second super memory block SUPER BLOCK<1> may be 1, and the controller 130 may set the set count to 2. In this case, the controller 130 may check that one super memory block (that is, the second super memory block SUPER BLOCK<1>) has the valid page count VPC<1> which is less than or equal to the set count. Thus, the controller 130 does not use the above-described first scheme. Instead, the controller 130 selects a memory block including at least one valid page among the N memory blocks in the second super memory block SUPER BLOCK<1> which has the valid page count VPC<1> less than or equal to the set count, as a victim block.

In another example, the valid page count VPC<0> of the first super memory block SUPER BLOCK<0> may be 4, the valid page count VPC<1> of the second super memory block SUPER BLOCK<1> may be 4, and the controller 130 may set the set count to 2. In this case, the controller 130 may check that both of the first super memory block SUPER BLOCK<0> and the second super memory block SUPER BLOCK<1>, have valid page counts which are less than or equal to the set count. Thus, the controller 130 uses the above-described first scheme. In other words, the controller 130 selects memory blocks, each including at least one valid page among the N memory blocks in the first super memory block SUPER BLOCK<0>, which has the shorter predicted required time PRE_TOTAL<0>, as victim blocks.

As described above, the controller 130 generates the predicted required times PRE_TOTAL<0, 1>, and manages the generated predicted required times PRE_TOTAL<0, 1> in the predicted required time table 600.

In this regard, the controller 130 may update the predicted required times PRE_TOTAL<0, 1> by using any one of the following two schemes.

In accordance with a first scheme, whenever a valid page count for a certain memory block changes, among the memory blocks of the memory device 150, the controller 130 may update the predicted required time of a super memory block including the certain memory block.

Referring to FIGS. 4 and 7A, for example, the valid page count of the first memory block BLOCK000 of the first plane PLANE00 of the first memory die DIE0 may change according to a first foreground operation or background operation. Then, the valid page count of the second memory block BLOCK001 of the first plane PLANE00 of the first memory die DIE0 may change according to performing of a second foreground operation or background operation.

In this case, in response to the change of the valid page count of the first memory block BLOCK000, the controller 130 may predictively calculate again the value of the first predicted required time PRE_TOTAL<0> corresponding to the first super memory block SUPER BLOCK<0> that includes the corresponding memory block BLOCK000. Then, in response to the change of the valid page count of the second memory block BLOCK001, the controller 130 may predictively calculate again the value of the second predicted required time PRE_TOTAL<1> corresponding to the second super memory block SUPER BLOCK<1> that includes the corresponding memory block BLOCK001.

In accordance with a second scheme, the controller 130 may checks at each preset time whether a certain memory block of which valid page count has changed exists among the plurality of memory blocks. As a result of checking, in the case where a certain memory block of which valid page count has changed exists, the controller 130 may update the predicted required time of a super memory block including the certain memory block.

Referring to FIGS. 4 and 7A, for example, as at least two successive foreground operations or background operations are performed between a first set time and a second set time, the valid page counts of the first memory block BLOCK000 and the second memory block BLOCK001 of the first plane PLANE00 of the first memory die DIE0 may change.

In this case, the controller 130 may check, at the second set time, whether a memory block of which valid page count has changed exists among the plurality of memory blocks.

As a result of checking, the controller 130 may determine that the valid page counts of the first memory block BLOCK000 and the second memory block BLOCK001 of the first plane PLANE00 of the first memory die DIE0 have changed. Therefore, the controller 130 may predictively calculate again simultaneously, at the second set time, the value of the first predicted required time PRE_TOTAL<0> corresponding to the first super memory block SUPER BLOCK<0> that includes the first memory block BLOCK000, and the value of the second predicted required time PRE_TOTAL<1> corresponding to the second super memory block SUPER BLOCK<1> that includes the second memory block BLOCK001.

In various embodiments, the set time may be defined in advance by a designer. Such time may be repeated each time data of a certain size is written or each time a specific operation is completed.

As garbage collection is performed, if all valid pages of the first super memory block SUPER BLOCK<0> as a victim block are transferred to the memory 144 and are then moved to the third super memory block SUPER BLOCK<2> as a target block, the first super memory block SUPER BLOCK<0> assumes a state in which no valid pages exist. Therefore, after garbage collection, the first super memory block SUPER BLOCK<0> as an invalid super memory block, need not be involved in any operation except an operation in which it becomes a free super memory block through an erase operation. In this regard, because the controller 130 has generated the first predicted required time PRE_TOTAL<0> for the first super memory block SUPER BLOCK<0> before performing garbage collection, the value thereof may be left in the predicted required time table 600 even after garbage collection is performed. Due to the value of the first predicted required time PRE_TOTAL<0> left in the predicted required time table 600 in this way, an unknown abnormal operation may be performed for the first super memory block SUPER BLOCK<0>. Therefore, after garbage collection for the first super memory block SUPER BLOCK<0> is performed, the controller 130 sets the first predicted required time PRE_TOTAL<0> corresponding to the first super memory block SUPER BLOCK<0> to a specific value, and thereby, prevents an unknown abnormal operation from being performed for the first super memory block SUPER BLOCK<0>. Here, the specific value may be set to a settable maximum value.

Summarizing this, in the case where a certain super memory block is selected as a victim block and all valid pages therein are moved to a target super memory block, the controller 130 may set a predicted required time for the selected super memory block to a certain value such that the selected super memory block cannot perform an unknown abnormal operation.

If the number of free memory blocks among the plurality of memory blocks in the memory device 150 is sufficiently large, the probability of performing garbage collection is not high. Namely, in general, garbage collection is an operation to be performed when the number of free blocks in the memory device 150 decreases to be less than or equal to a threshold number.

Thus, the controller 130 generates and manages the above-described predicted required times PRE_TOTAL<0, 1> during a period in which the number of free memory blocks among the plurality of memory blocks in the memory device 150 is less than or equal to a first number. Further, the controller 130 does not generate and manage the predicted required times PRE_TOTAL<0, 1> during a period in which the number of free memory blocks among the plurality of memory blocks in the memory device 150 is greater than or equal to a second number, which is greater than the first number.

In various embodiments, the first number may be set differently from the number for determining a trigger time of a general garbage collection operation. For example, the trigger time number may be less than the first number.

Although various embodiments have been illustrated and described, it will be apparent to those skilled in the art in light of this disclosure that various changes and modifications may be made without departing from the spirit and scope of the invention as defined in the following claims.

What is claimed is:

1. A memory system comprising:
a nonvolatile memory device including a plurality of dies, each die including a plurality of planes, each plane including a plurality of blocks, each block including a plurality of pages, and further including a plurality of page buffers, each page buffer for caching data in a unit of a page to be inputted to, and outputted from, each of the blocks; and
a controller suitable for managing a plurality of super blocks according to a condition, each super block including N blocks capable of being read in parallel among the blocks, generating predicted required times for the super blocks, respectively, each of the predicted required times representing a time needed to extract valid data from the corresponding super block, and selecting a victim block for garbage collection from among the blocks based on the predicted required times,
wherein N is a natural number of 2 or greater, and
wherein the controller generates and manages the predicted required times during a period in which a number of free blocks among the blocks is less than or equal to a first number, and
the controller does not manage the predicted required times during a period in which the number of free blocks among the blocks is greater than or equal to a second number, which is greater than the first number.

2. The memory system according to claim 1, wherein,
when parallel read is enabled only for pages at a same position in respective N blocks in a first super block of the super blocks,
the controller generates the predicted required time corresponding to the first super block by summing a first time and a second time, the first time calculated by multiplying a number by a predicted read time, the number representing a difference between a count of valid pages of which positions are the same among the N blocks of the first super block, and a first count representing a sum of valid page counts of the N blocks and a predicted read time, the second time representing a product of the first count and a predicted transmission time,
wherein the predicted read time is a time that is predicted to be required to cache data of the first super block in the page buffers, and
wherein the predicted transmission time is a time that is predicted to be required to transmit the data cached in the page buffers to the controller.

3. The memory system according to claim 1, wherein,
when parallel read is enabled for pages at different positions in respective N blocks in a second super block of the super blocks the controller generates the predicted required time corresponding to the second super block by summing a third time and a fourth time, the third time calculated by multiplying a largest count among valid page counts of the N blocks by a predicted read time, the fourth time calculated by multiplying a count representing a sum of the valid page counts of the N blocks by a predicted transmission time, wherein the predicted read time is a time that is predicted to be required to cache data of the second super block in the page buffers, and wherein the predicted transmission time is a time that is predicted to be required to transmit the data cached in the page buffers to the controller.

4. The memory system according to claim 1, wherein, whenever a valid page count of a block among the blocks, changes, the controller calculates an updated predicted required time corresponding to the super block that includes the block of which the valid page count has changed.

5. The memory system according to claim 1, wherein the controller checks, at each set time, whether a block of which a valid page count has changed exists among the blocks of the super blocks, and when a block of which a valid page count has changed exists, calculates an updated predicted required time corresponding to the super block that includes the block of which the valid page count has changed.

6. The memory system according to claim 1, wherein the controller selects, as a victim block, a block including at least one valid page among the N blocks of a super block corresponding to a lowest predicted required time among the predicted required times.

7. The memory system according to claim 1, wherein, when only one superblock among the super blocks has a number of valid pages less than or equal to a set count, the controller selects N blocks of the one super block, as victim blocks, and when at least two superblocks among the super blocks each have a number of valid pages less than or equal to the set count, the controller selects, as the victim block, a block including at least one valid page among the N blocks of a super block having a lowest predicted required time among at least two predicted required times respectively corresponding to the at least two super blocks.

8. The memory system according to claim 1, wherein, when the N blocks of a super block among the super blocks are selected as victim blocks and all valid data are moved to a target block, the controller sets a predicted required time corresponding to the selected super block to a specific value.

9. The memory system according to claim 1,
wherein a first die of the plurality of dies is coupled to a first channel, a second die of the plurality of dies is coupled to a second channel, planes included in the first die are coupled to a plurality of first ways which share the first channel, and planes included in the second die are coupled to a plurality of second ways which share the second channel, and wherein the controller manages a first super block including a first block which is in a first plane of the first die and a second block which is in a second plane of the first die and manages a second super block including a third block which is in a third plane of the second die and a fourth block which is in a fourth plane of the second die, according to the condition, wherein the controller manages a third super block including a first block which is in a first plane of the first die and a third block which is in a third plane of the second die and manages a fourth super block including a second block which is in a second plane of the first die and a fourth block which is in a fourth plane of the second die, according to the condition, or wherein the controller manages a fifth super block including a first block which is in a first plane of the first die, a second block which is in a second plane of the first die, a third block which is in a third plane of the second die and a fourth block which is in a fourth plane of the second die, according to the condition.

10. A method for operating a memory system including a controller and a nonvolatile memory device including a plurality of dies, each die including a plurality of planes, each plane including a plurality of blocks, each block including a plurality of pages, and including a plurality of page buffers, each page buffer for caching data in a unit of a page to be inputted to, and outputted from, each of the blocks, the method comprising:

managing a plurality of super blocks according to a set condition, each super block including N blocks capable of being read in parallel among the blocks;

generating predicted required times for the super blocks, respectively, each of the predicted required times representing a time needed to extract valid data from the corresponding super block; and selecting a victim block for garbage collection from among the blocks based on the predicted required times, wherein N is a natural number of 2 or greater, and
wherein the generating of the predicted required times comprises:

generating and managing the predicted required times during a period in which a number of free blocks among the blocks is less than or equal to a first number; and not managing the predicted required times during a period in which the number of free blocks among the blocks is greater than or equal to a second number, which is greater than the first number.

11. The method according to claim 10, wherein, when parallel read is enabled only for pages at a same position in respective N blocks in a first super block among the super blocks, the generating of the predicted required times comprises:

calculating a first time by multiplying a number by a predicted read time, the number representing a difference between a count of valid pages of which positions are the same among the N blocks of the first super block and a first count representing a sum of valid page counts of the N blocks of the first super block and a predicted read time;

calculating a second time by multiplying the first count by a predicted transmission time;

generating the predicted required time for each super block by summing the first time and the second time for that super block, wherein the predicted read time is a time that is predicted to be required to cache data of the first super block in the page buffers, and the predicted transmission time is a time that is predicted to be required to transmit the data cached in the page buffers to the controller.

12. The method according to claim 10, wherein, when parallel read is enabled for pages at different positions in respective N blocks in a second super block among the super blocks, the generating of the predicted required times comprises:

calculating a third time by multiplying a largest count among valid page counts of the N blocks in the second super block by a predicted read time;

calculating a fourth time by multiplying a count obtained by summing the valid page counts of the N blocks in the second super block by a predicted transmission time;

generating the predicted required time corresponding to the second super block by summing the third time and the fourth time, wherein the predicted read time is a time that is predicted to be required to cache data of the second super block in the page buffers, and the predicted transmission time is a time that is predicted to be required to transmit the data cached in the page buffers to the controller.

13. The method according to claim 10, further comprising:

calculating, whenever a valid page count of a block among the blocks, changes, an updated predicted required time corresponding to the super block that includes the block of which the valid page count has changed.

14. The method according to claim 10, further comprising:

checking, at each set time, whether a block of which a valid page count has changed exists among the blocks, and when a block of which a valid page count has changed exists, calculating an updated predicted required time corresponding to the super block that includes the block of which the valid page count has changed.

15. The method according to claim 10, wherein the selecting of the victim block comprises selecting, as a victim block, a block including at least one valid page among N blocks of a super block corresponding to a lowest predicted required time among the predicted required times.

16. The method according to claim 10, wherein the selecting of the victim block comprises:

selecting, when only one super block has a number of valid pages less than or equal to a set count, N blocks of the one super block, as victim blocks; and selecting, when at least two super blocks each have a number of valid pages less than or equal to the set count, as the victim block, a block including at least one valid page among N blocks of a super block a lowest predicted required time among at least two predicted required times respectively corresponding to the at least two super blocks.

17. The method according to claim 10, further comprising:

setting, when N number of blocks of a super block among the super blocks are selected as victim blocks and all valid data are moved to a target block, a predicted required time corresponding to the selected super block to a specific value.

18. The method according to claim 10, wherein a first die of the plurality of dies is coupled to a first channel, a second die of the plurality of dies is coupled to a second channel, planes included in the first die are coupled to a plurality of first ways which share the first channel, and planes included in the second die are coupled to a plurality of second ways which share the second channel, and wherein the set condition includes managing a super block including a first block which is in a first plane of the first die and a second block which is in a second plane of the first die and managing a super block including a third block which is in a third plane of the second die and a fourth block which is in a fourth plane of the second die, wherein the set condition includes managing a super block including a first block which is in a first plane of the first die and a third block which is in a third plane of the second die and managing a super block including a second block which is in a second plane of the first die and a fourth block which is in a fourth plane of the second die, or wherein the set condition includes managing a super block including a first block which is in a first plane of the first die, a second block which is in a second plane of the first die, a third block which is in a third plane of the second die and a fourth block which is in a fourth plane of the second die.

\* \* \* \* \*